(12) United States Patent
Ezaki et al.

(10) Patent No.: US 9,958,004 B2
(45) Date of Patent: May 1, 2018

(54) VARIABLE LENGTH CONNECTING ROD AND VARIABLE COMPRESSION RATIO INTERNAL COMBUSTION ENGINE

(71) Applicant: TOYOTA JIDOSHA KABUSHIKI KAISHA, Toyota-shi, Aichi-ken (JP)

(72) Inventors: Shuichi Ezaki, Susono (JP); Akio Kidooka, Kanagawa-ken (JP); Yoshiro Kamo, Kanagawa-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1 day.

(21) Appl. No.: 14/919,841

(22) Filed: Oct. 22, 2015

(65) Prior Publication Data

US 2016/0177997 A1    Jun. 23, 2016

(30) Foreign Application Priority Data

Dec. 22, 2014   (JP) ................................. 2014-259413

(51) Int. Cl.
*F16C 7/06*    (2006.01)
*F02B 75/04*   (2006.01)
(Continued)

(52) U.S. Cl.
CPC .............. *F16C 7/06* (2013.01); *F02B 75/045* (2013.01); *F16C 23/10* (2013.01); *F16J 7/00* (2013.01); *F16C 9/04* (2013.01); *F16C 2360/22* (2013.01)

(58) Field of Classification Search
CPC ...... F02B 75/045; F02B 75/04; F02B 75/044; F16C 7/06; F02D 15/00
See application file for complete search history.

(56) References Cited

U.S. PATENT DOCUMENTS 6,568,357 B1 *  5/2003  Rao ........................ F02B 75/045
                                                    123/48 B
6,622,669 B1 *  9/2003  Nageswar Rao ..... F02B 75/045
                                                    123/48 B
(Continued)

FOREIGN PATENT DOCUMENTS

CN      102213332 A     10/2011
DE        3148193 A1     6/1983
(Continued)

*Primary Examiner* — Long T Tran
(74) *Attorney, Agent, or Firm* — Andrews Kurth Kenyon LLP

(57) ABSTRACT

A variable length connecting rod which can change the effective length comprises a connecting rod body, an eccentric member which is attached at the small end to the connecting rod body to be able to swivel and which changes the effective length of a variable length connecting rod when swiveled, one piston mechanism which has one hydraulic cylinder which is provided in the connecting rod body and one hydraulic piston which slides in the hydraulic cylinder, a direction switching mechanism which switches between supply and discharge of hydraulic fluid to the hydraulic cylinder, and a hydraulic fluid supply source which supplies the hydraulic cylinder with hydraulic fluid. The piston mechanism is configured so that the eccentric member swivels in one direction if hydraulic fluid is supplied to the hydraulic cylinder and so that the eccentric member swivels in the other direction if hydraulic fluid is discharged from the hydraulic cylinder.

11 Claims, 17 Drawing Sheets

(51) Int. Cl.
*F16C 23/10* (2006.01)
*F16J 7/00* (2006.01)
*F16C 9/04* (2006.01)

(56) References Cited

U.S. PATENT DOCUMENTS

| | | | |
|---|---|---|---|
| 6,705,255 B2* | 3/2004 | Papaioannou | F02B 75/04 123/48 R |
| 6,752,105 B2* | 6/2004 | Gray, Jr. | F02B 75/045 123/48 B |
| 7,685,974 B2* | 3/2010 | Berger | F02B 75/045 123/48 B |
| 8,151,691 B2* | 4/2012 | Pirault | F02B 75/044 123/78 R |
| 2003/0075125 A1 | 4/2003 | Kreuter | |
| 2004/0025814 A1* | 2/2004 | Gray, Jr. | F02B 75/045 123/48 B |
| 2015/0059683 A1 | 3/2015 | Schulze et al. | |
| 2015/0152794 A1* | 6/2015 | Paul | F02D 15/02 123/48 R |
| 2015/0260094 A1 | 9/2015 | Wittek | |

FOREIGN PATENT DOCUMENTS

| | | |
|---|---|---|
| DE | 102012020999 A1 | 1/2014 |
| DE | 102013014090 A1 | 3/2015 |
| JP | S59040537 U | 3/1984 |
| JP | 2011-196549 A | 10/2011 |
| WO | 2014/019683 A1 | 2/2014 |

\* cited by examiner

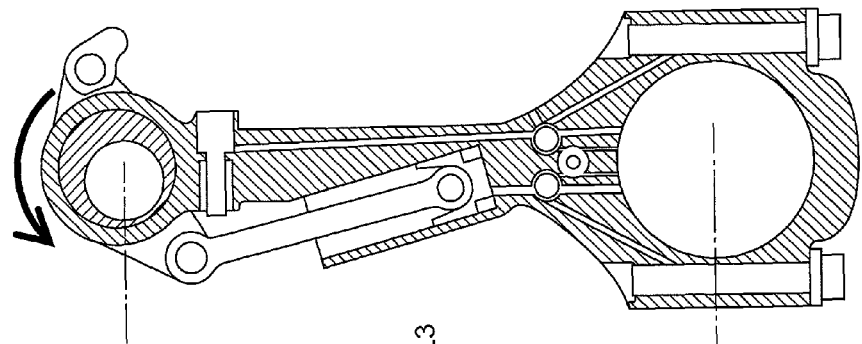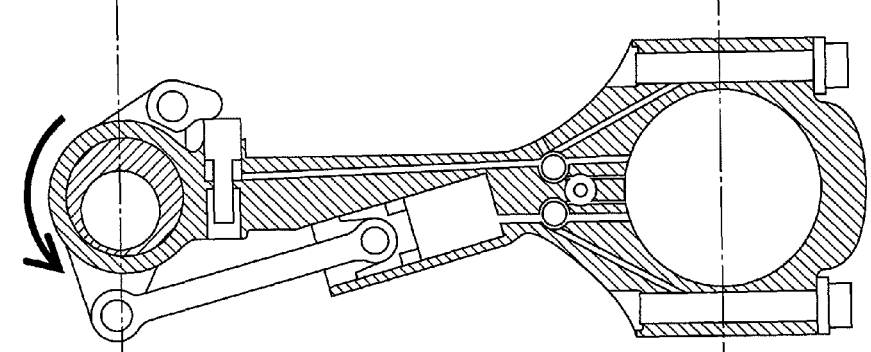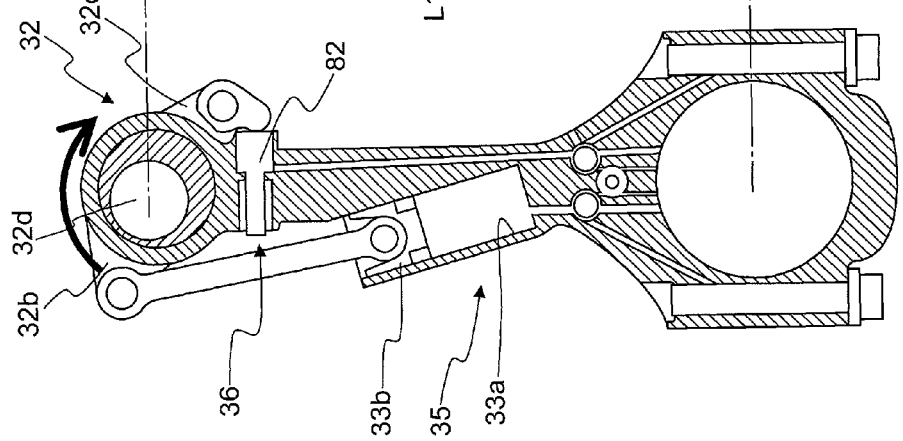

VARIABLE LENGTH CONNECTING ROD AND VARIABLE COMPRESSION RATIO INTERNAL COMBUSTION ENGINE

CROSS-REFERENCE TO RELATED APPLICATION

The present application claims priority to Japanese Patent Application No. 2014-259413 filed on Dec. 22, 2014, which is incorporated herein by reference in its entirety.

TECHNICAL FIELD

The present invention relates to a variable length connecting rod which can change in its effective length and a variable compression ratio internal combustion engine which is provided with a variable length connecting rod.

BACKGROUND ART

Known in the past has been an internal combustion engine provided with a variable compression ratio mechanism which can change a mechanical compression ratio of the internal combustion engine. As such a variable compression ratio mechanism, various mechanisms have been proposed. As one among these, one which can change the effective length of a connecting rod used in the internal combustion engine may be mentioned (for example, PTLs 1 and 2). In this regard, the "effective length of a connecting rod" means the distance between a center of a crank pin receiving opening which receives a crank pin and a center of a piston pin receiving opening which receives a piston pin. Therefore, if the effective length of a connecting rod becomes longer, a combustion chamber volume when the piston is at top dead center of the compression stroke becomes smaller, and therefore the mechanical compression ratio increases. On the other hand, if the effective length of a connecting rod becomes shorter, the combustion chamber volume when the piston is at top dead center of the compression stroke becomes larger, and therefore the mechanical compression ratio falls.

As a variable length connecting rod which can be changed in effective length, known is one which is provided with a connecting rod body with a small end on which an eccentric member (eccentric arm or eccentric sleeve), which can swivel with respect to the connecting rod body, is provided (for example, PTLs 1 and 2). The eccentric member has a piston pin receiving opening which receives the piston pin. This piston pin receiving opening is provided so as to offset with respect to a swivel axis of the eccentric member. In such a variable length connecting rod, if changing the swivel position of the eccentric member, the effective length of the connecting rod can be changed accordingly.

CITATION LIST

Patent Literature

PTL 1: Japanese Patent Publication No. 2011-196549A
PTL 2: International Publication No. 2014/019683A

SUMMARY OF INVENTION

Technical Problem

In this regard, in the variable length connecting rod described in PTLs 1 and 2, two piston mechanisms are connected to the eccentric member. Each piston mechanism comprises a cylinder which is formed in the connecting rod body of the variable length connecting rod, and a piston which can slide in the cylinder. Therefore, in the variable length connecting rod described in PTLs 1 and 2, two piston mechanisms are provided. However, if providing such piston mechanisms, since pistons are provided in the connecting rod body, the total weight of the connecting rod is larger. Further, since cylinders are formed at the connecting rod body, the connecting rod body falls in strength. If, for this reason, making up for the fall in strength of the connecting rod body by increasing the thickness of the connecting rod body, etc., this also causes the total weight of the connecting rod to increase.

On the other hand, for maintaining an eccentric member at a first position where it was swiveled in one direction, it is necessary to supply hydraulic pressure to a first piston mechanism which is connected to one end of the eccentric member. Similarly, for maintaining the eccentric member at a second position where it was swiveled in the other direction, it is necessary to supply hydraulic pressure to a second piston mechanism which is connected to the other end of the eccentric member. Therefore, to enable the eccentric member to be maintained at the first position and second position, two piston mechanisms were considered necessary. Therefore, it was difficult to reduce the piston mechanisms to one.

Therefore, in view of this issue, an object of the present invention is to provide a variable length connecting rod which can reduce the total weight of the connecting rod.

Solution to Problem

To solve the above problem, the following inventions are provided.

(1) A variable length connecting rod which can be changed in effective length, comprising: a connecting rod body having, at a big end, a crank pin receiving opening which receives a crank pin; an eccentric member attached to the connecting rod body at a small end at an opposite side to the big end so as to be able to swivel in a circumferential direction of the small end, the eccentric member changing the effective length of the variable length connecting rod if swiveled; a piston mechanism having one hydraulic cylinder provided in the connecting rod body and one hydraulic piston slidable in the hydraulic cylinder, the piston mechanism configured so that if the hydraulic cylinder is supplied with hydraulic fluid, the eccentric member swivels in one direction while if the hydraulic cylinder discharges hydraulic fluid, the eccentric member swivels in the other direction; a hydraulic fluid supply source supplying a hydraulic fluid to the hydraulic cylinder; and a flow direction switching mechanism which can switch the flow of hydraulic fluid between a first state which permits the supply of hydraulic fluid from the hydraulic fluid supply source to the hydraulic cylinder, but prohibits the discharge of hydraulic fluid from the hydraulic cylinder and a second state which prohibits the supply of hydraulic fluid to the hydraulic cylinder, but permits the discharge of hydraulic fluid from the hydraulic cylinder, wherein the variable length connecting rod comprises just one the piston mechanism for swiveling the eccentric member.

(2) The variable length connecting rod according to above (1), wherein the flow direction switching mechanism can switch between the first state and the second state by hydraulic pressure, and is configured to become the second state where the effective length of the variable length connecting rod becomes shorter when hydraulic pressure is not supplied and to become the first state where the effective length of the variable length connecting rod becomes longer when hydraulic pressure is supplied.

(3) The variable length connecting rod according to above (1) or (2), wherein the eccentric member comprises a piston pin receiving opening which receives a piston pin and is configured so that the axis of the piston pin receiving opening is offset from the swivel axis of the eccentric member, and wherein an open end of the hydraulic cylinder is arranged at a side where the piston pin receiving opening is offset from an axis of the variable length connecting rod.

(4) The variable length connecting rod according to any one of above (1) to (3), wherein the flow direction switching mechanism is arranged between the hydraulic cylinder and the crank pin receiving opening in an axial direction of the connecting rod body.

(5) The variable length connecting rod according to any one of above (1) to (4), wherein the flow direction switching mechanism comprises a switching pin which is provided in the connecting rod body and which operates by hydraulic pressure supplied from the outside, and the switching pin is configured so that by operation of the switching pin, the flow direction switching mechanism is switched between the first state and the second state and is arranged in the connecting rod body so that the operating direction becomes parallel to the axis of the crank pin receiving opening.

(6) The variable length connecting rod according to any one of above (1) to (5), wherein the connecting rod further comprises an exhaust fluid path for discharging hydraulic fluid to the outside of the connecting rod body, the flow direction switching mechanism comprises a single check valve which permits flow from a primary side to a secondary side and prohibits flow from a secondary side to a primary side and two switching pins, and the two switching pins are configured so that when the flow direction switching mechanism is in a first state, the primary side of the check valve is communicated with the hydraulic fluid supply source and the secondary side of the check valve is communicated with the hydraulic cylinder, and when the flow direction switching mechanism is in a second state, the primary side of the check valve is communicated with the hydraulic cylinder and the secondary side of the check valve is communicated with the exhaust fluid path.

(7) The variable length connecting rod according to above (6), wherein the two switching pins are provided at the two sides from a center axis of the connecting rod body and the check valve is provided on a center axis of the connecting rod body.

(8) The variable length connecting rod according to any one of above (1) to (7), further comprising a stopping device which can use hydraulic pressure to make the eccentric member stop at an intermediate position between a first position at which it is swiveled the most to one side and a second position at which it is swiveled the most to the opposite side from the one side.

(9) The variable length connecting rod according to above (8), wherein the eccentric member comprises a first arm and a second arm which extends in an opposite direction to the first arm, and a hydraulic piston of the piston mechanism is connected to the first arm, and the stopping device comprises a stopping member which can project out from the connecting rod body in the direction in which the second arm extends, and is configured so that when stopping member projects out from the connecting rod body, the stopping member abuts against the eccentric member whereby the eccentric member can be stopped at the intermediate position.

(10) The variable length connecting rod according to above (9), wherein the flow direction switching mechanism can be switched between the first state and the second state by hydraulic pressure supplied from a hydraulic pressure supply source, and the stopping device is switched between a state where the stopping member projects out and a state where it does not project out by hydraulic pressure supplied from the hydraulic pressure supply source, and a switching hydraulic pressure in the flow direction switching mechanism and a switching hydraulic pressure in the stopping device are different values.

(11) The variable length connecting rod according to any one of above (1) to (10), wherein the eccentric member comprises a first arm and a second arm which extends in an opposite direction to the first arm, and the hydraulic piston of the piston mechanism is connected to the first arm, and the second arm is bent, at the end at the opposite side to the first arm side, toward the big end of the connecting rod body.

(12) A variable compression ratio internal combustion engine which can change a mechanical compression ratio, having a variable length connecting rod according to any of above (1) to (11), wherein mechanical compression ratio is changed by changing the effective length of the variable length connecting rod.

Advantageous Effects of Invention

According to the present invention, it is possible to reduce the total weight of the connecting rod in a variable length connecting rod.

BRIEF DESCRIPTION OF DRAWINGS

FIGS. 15A to 15C are cross-sectional side views which schematically show a variable length connecting rod according to the present invention.

DESCRIPTION OF EMBODIMENTS

Below, an embodiment of the present invention will be explained in detail with reference to the drawings. Note that, in the following explanation, similar component elements will be assigned the same reference notations.

<Variable Compression Ratio Internal Combustion Engine>

Figure 1:
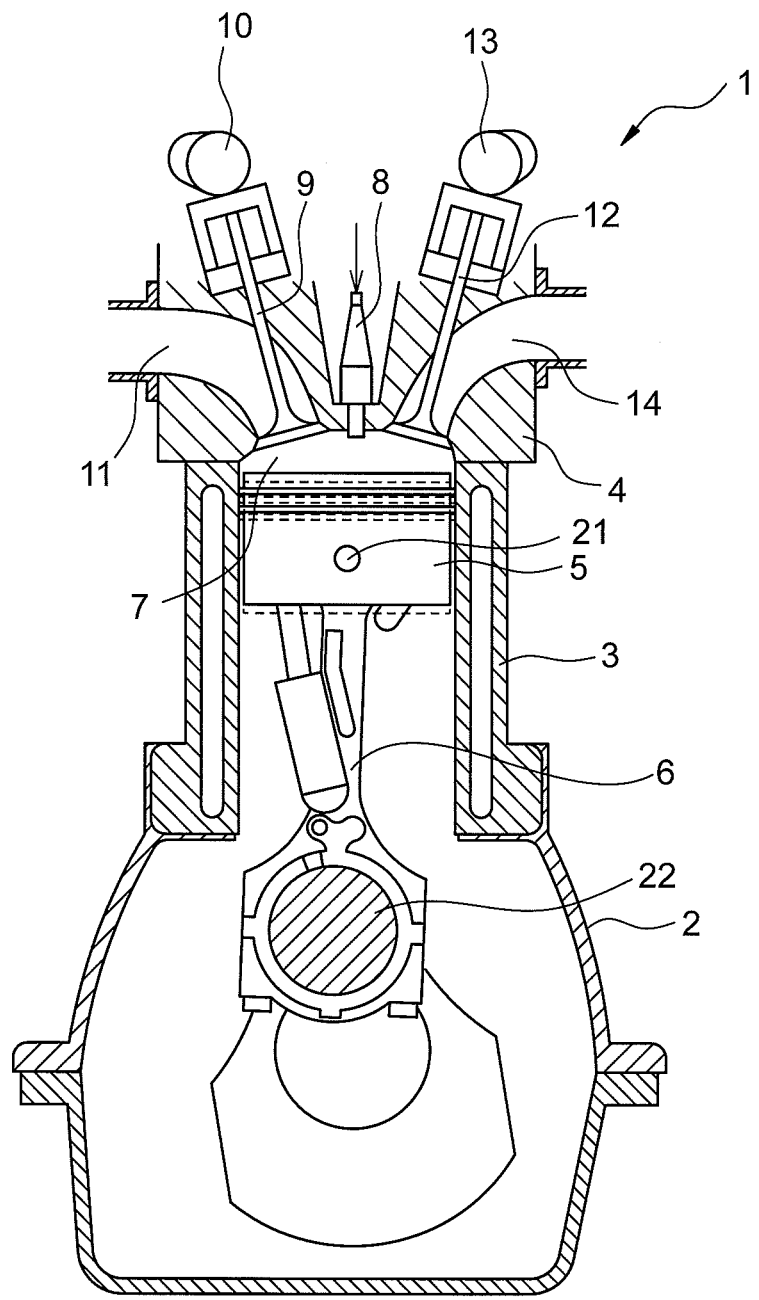
FIG. 1 is a schematic side cross-sectional view of a variable compression ratio internal combustion engine.

FIG. 1 is a side cross-sectional view of a variable compression ratio internal combustion engine according to the present invention.

Referring to FIG. 1, 1 indicates an internal combustion engine. The internal combustion engine 1 comprises a crankcase 2, cylinder block 3, cylinder head 4, piston 5, variable length connecting rod 6, combustion chamber 7, spark plug 8 arranged at the center of the top surface of the combustion chamber 7, intake valve 9, intake cam shaft 10, intake port 11, exhaust valve 12, exhaust cam shaft 13, and exhaust port 14.

The variable length connecting rod 6 is connected at a small end thereof by a piston pin 21 to the piston 5, and is connected at a big end thereof to a crank pin 22 of the crankshaft. The variable length connecting rod 6, as explained later, can change the distance from the axis of the piston pin 21 to the axis of the crank pin 22, that is, the effective length.

If the effective length of the variable length connecting rod 6 becomes longer, the length from the crank pin 22 to the piston pin 21 is longer, and therefore as shown by the solid line in the figure, the volume of the combustion chamber 7 when the piston 5 is at top dead center is smaller. On the other hand, even if the effective length of the variable length connecting rod 6 changes, the stroke length of the piston 5 reciprocating in the cylinder does not change. Therefore, at this time, the mechanical compression ratio at the internal combustion engine 1 is larger.

On the other hand, if the effective length of the variable length connecting rod 6 is shorter, the length from the crank pin 22 to the piston pin 21 is shorter, and therefore as shown by the broken line in the figure, the volume of the combustion chamber when the piston 5 is at top dead center is larger. However, as explained above, the stroke length of the piston 5 is constant. Therefore, at this time, the mechanical compression ratio at the internal combustion engine 1 is smaller.

<Configuration of Variable Length Connecting Rod>

Figure 2:
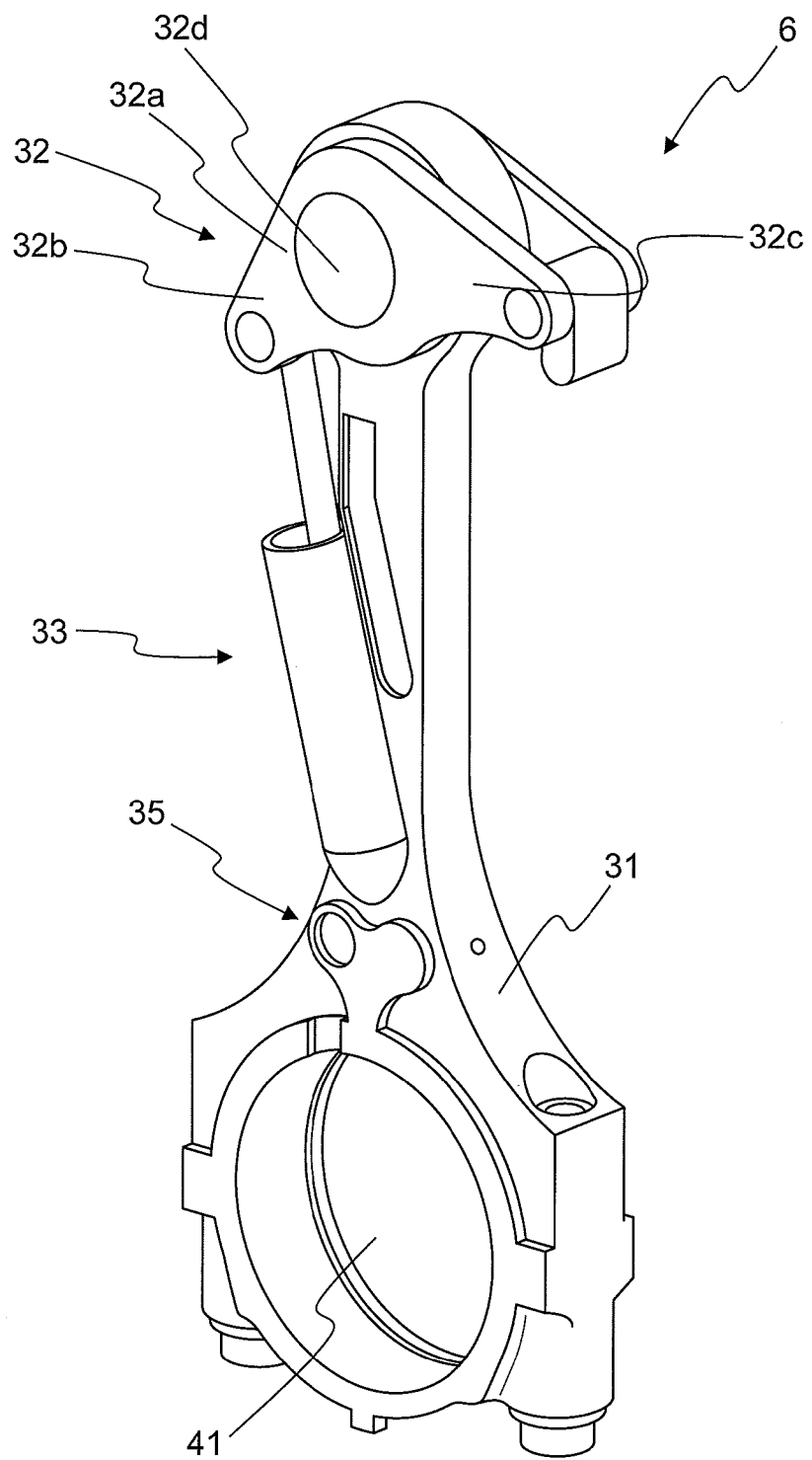
FIG. 2 is a perspective view which schematically shows a variable length connecting rod according to the present invention.
Figure 3:
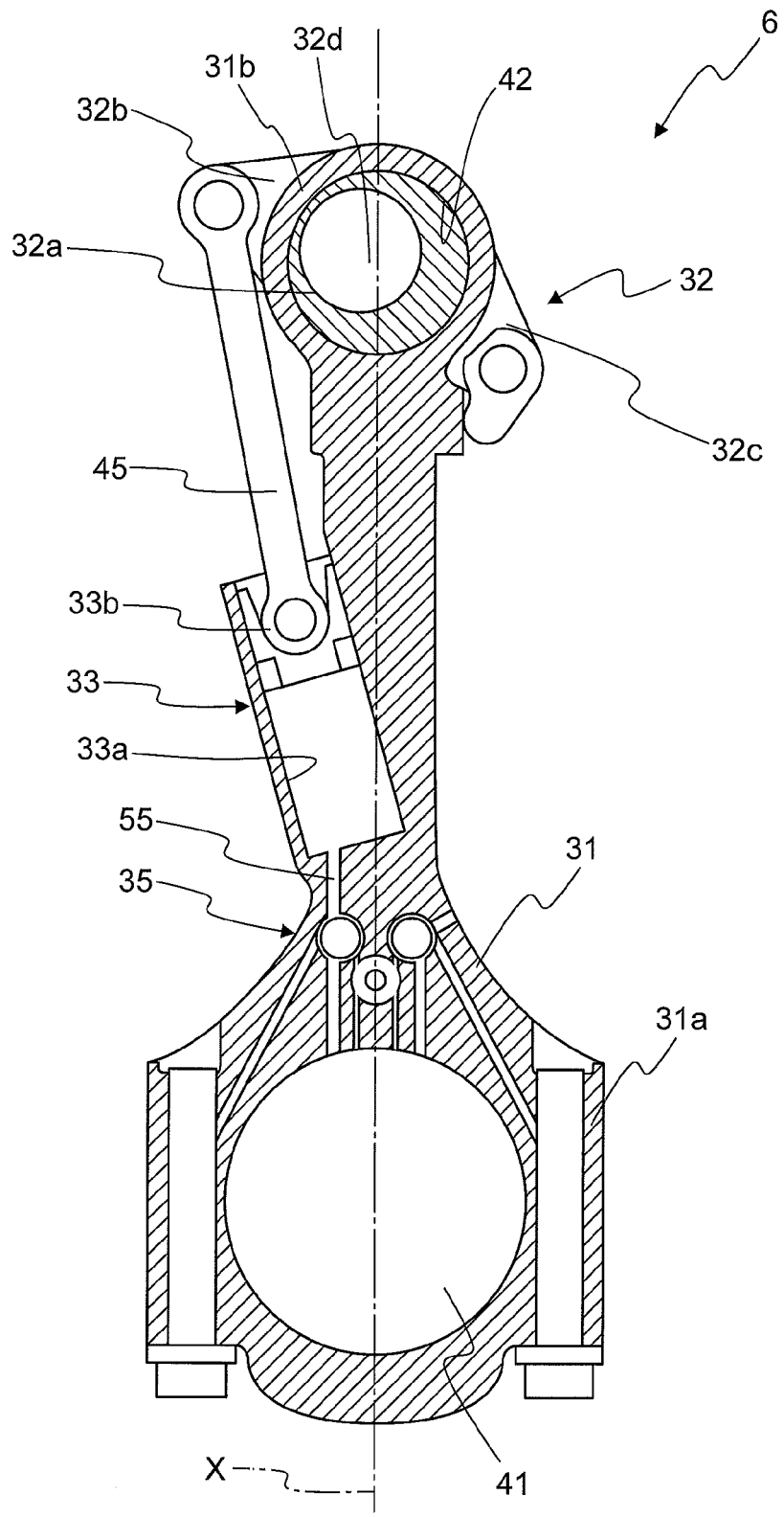
FIG. 3 is a cross-sectional side view which schematically shows a variable length connecting rod according to the present invention.

FIG. 2 is a perspective view which schematically shows the variable length connecting rod 6 according to the first embodiment, while FIG. 3 is a cross-sectional side view which schematically shows a variable length connecting rod 6 according to the first embodiment. As shown in FIG. 2 and FIG. 3, the variable length connecting rod 6 comprises a connecting rod body 31, an eccentric member 32 which is attached to the connecting rod body 31 to be able to swivel, a piston mechanism 33 which is provided at the connecting rod body 31, and a flow direction switching mechanism 35 which switches the flow of hydraulic fluid to the piston mechanism 33.

First, the connecting rod body 31 will be explained. The connecting rod body 31 has at one end a crank pin receiving opening 41 which receives the crank pin 22 of the crankshaft, and has at the other end a sleeve receiving opening 42 which receives the sleeve of the later explained eccentric member 32. The crank pin receiving opening 41 is larger than the sleeve receiving opening 42, and therefore the end of the connecting rod body 31 of the side where the crank pin receiving opening 41 is provided, will be called the big end 31a, while the end of the connecting rod body 31 of the side where the sleeve receiving opening 42 is provided, will be called the small end 31b.

Note that, in this Description, an axis X extending between a center axis of the crank pin receiving opening 41 (that is, the axis of the crank pin 22 received in the crank pin receiving opening 41) and a center axis of the sleeve receiving opening 42 (that is, the axis of the sleeve received in the sleeve receiving opening 42) (FIG. 3), that is, the line passing through the center of the connecting rod body 31, will be called the "axis of the connecting rod 6". Further, the length of the connecting rod in the direction perpendicular to the axis X of the connecting rod 6 and perpendicular to the center axis of the crank pin receiving opening 41 will be called the "width of the connecting rod". In addition, the length of the connecting rod in the direction parallel to the center axis of the crank pin receiving opening 41 will be called the "thickness of the connecting rod".

As will be understood from FIG. 2 and FIG. 3, the width of the connecting rod body 31 is narrowest at the intermediate part between the big end 31a and the small end 31b. Further, the width of the big end 31a is larger than the width of the small end 31b. On the other hand, the thickness of the connecting rod body 31 is substantially a constant thickness, except for the region at which the piston mechanisms 33, 34 are provided.

Figure 4:
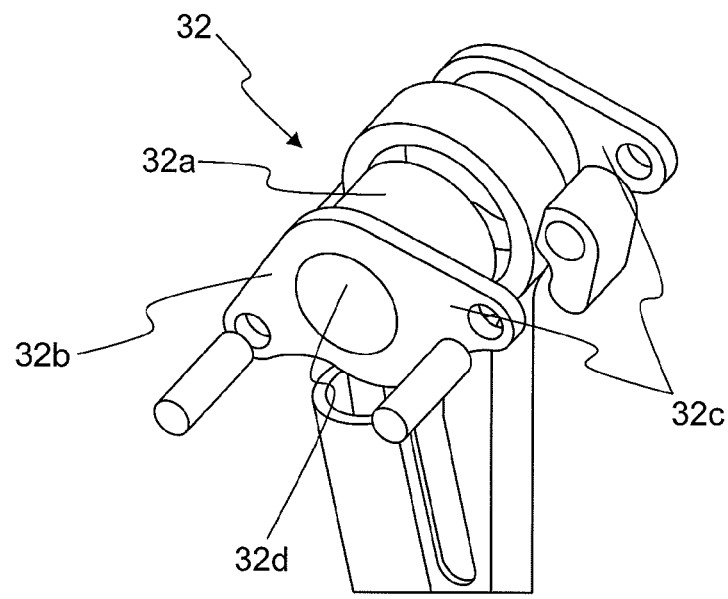
FIG. 4 is a schematic disassembled perspective view of the vicinity of a small end of a connecting rod body.
Figure 5:
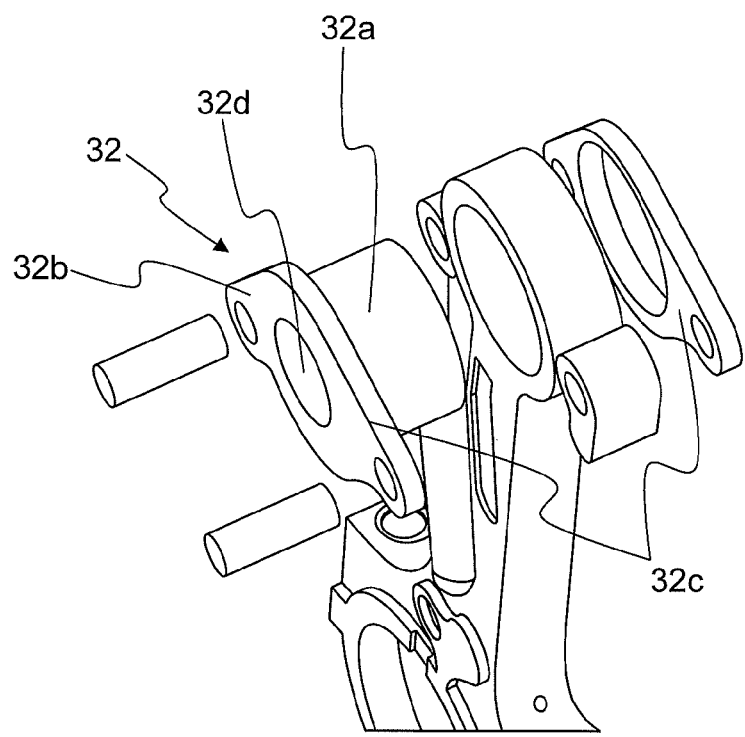
FIG. 5 is a schematic disassembled perspective view of the vicinity of a small end of a connecting rod body.

Next, the eccentric member 32 will be explained. FIG. 4 and FIG. 5 are schematic perspective views of the vicinity of the small end 31b of the connecting rod body 31. In FIG. 4 and FIG. 5, the eccentric member 32 is shown in the disassembled state. Referring to FIG. 2 to FIG. 5, the eccentric member 32 comprises: a cylindrical sleeve 32a received in a sleeve receiving opening 42 formed in the connecting rod body 31; a pair of first arms 32b extending from the sleeve 32a in one direction of the width direction of the connecting rod body 31; and a pair of second arms 32c extending from the sleeve 32a in the other direction of the width direction of the connecting rod body 31 (direction generally opposite to above one direction). The sleeve 32a can swivel in the sleeve receiving opening 42, and therefore the eccentric member 32 is attached to be able to swivel with respect to the connecting rod body 31 in the small end 31b of the connecting rod body 31.

The ends of the second arms 32c at the opposite side from the sleeve 32a side (that is, the first arm side) are bent toward the big end 31a of the connecting rod body 31. In particular, in the present embodiment, the ends of the second arms 32c at the opposite side from the sleeve 32a side are formed to extend in the tangential direction of the sleeve 32a.

Further, the sleeve 32a of the eccentric member 32 has a piston pin receiving opening 32d for receiving a piston pin 21. This piston pin receiving opening 32d is formed in a cylindrical shape. The cylindrical piston pin receiving opening 32d has an axis parallel to the center axis of the cylindrical shape of the sleeve 32a, but is formed so as not to become coaxial with it. Therefore, the center of the piston pin receiving opening 32d is offset from the center of the cylindrical external shape of the sleeve 32a.

In particular, in the present embodiment, the center of the piston pin receiving opening 32d of the sleeve 32a is offset from the center of the cylindrical external shape of the sleeve 32a toward the first arm 32b side. Therefore, if the eccentric member 32 swivels, the position of the piston pin receiving opening 32d in the sleeve receiving opening 42 changes. When the position of the piston pin receiving opening 32d is at the big end 31a side in the sleeve receiving opening 42, the effective length of the connecting rod becomes shorter. Conversely, when the position of the piston pin receiving opening 32d is at the opposite side to the big end 31a side in the sleeve receiving opening 42, the effective length of the connecting rod becomes longer. Therefore, according to the present embodiment, by swiveling the eccentric member, the effective length of the connecting rod 6 changes.

Next, referring to FIG. 3, the piston mechanism 33 will be explained. The piston mechanism 33 has a hydraulic cylinder 33a formed in the connecting rod body 31 and a hydraulic piston 33b sliding in the hydraulic cylinder 33a. The hydraulic cylinder 33a is arranged at the first arm 32b side from the axis X of the connecting rod 6 almost entirely or entirely. Further, the hydraulic cylinder 33a is arranged slanted by exactly a certain extent of angle with respect to the axis X so that it sticks out in the width direction of the connecting rod body 31 the more to the small end 31b. Further, the hydraulic cylinder 33a is connected to the flow direction switching mechanism 35 through a piston communicating fluid path 55.

The hydraulic piston 33b is connected by a first connecting member 45 to the first arm 32b of the eccentric member 32. The hydraulic piston 33b is connected by the pin to the first connecting member 45 to be able to rotate. The first arm 32b is connected by a pin to the first connecting member 45 to be able to rotate at the end at the opposite side from the side joined to the sleeve 32a.

<Operation of Variable Length Connecting Rod>

Figure 6:
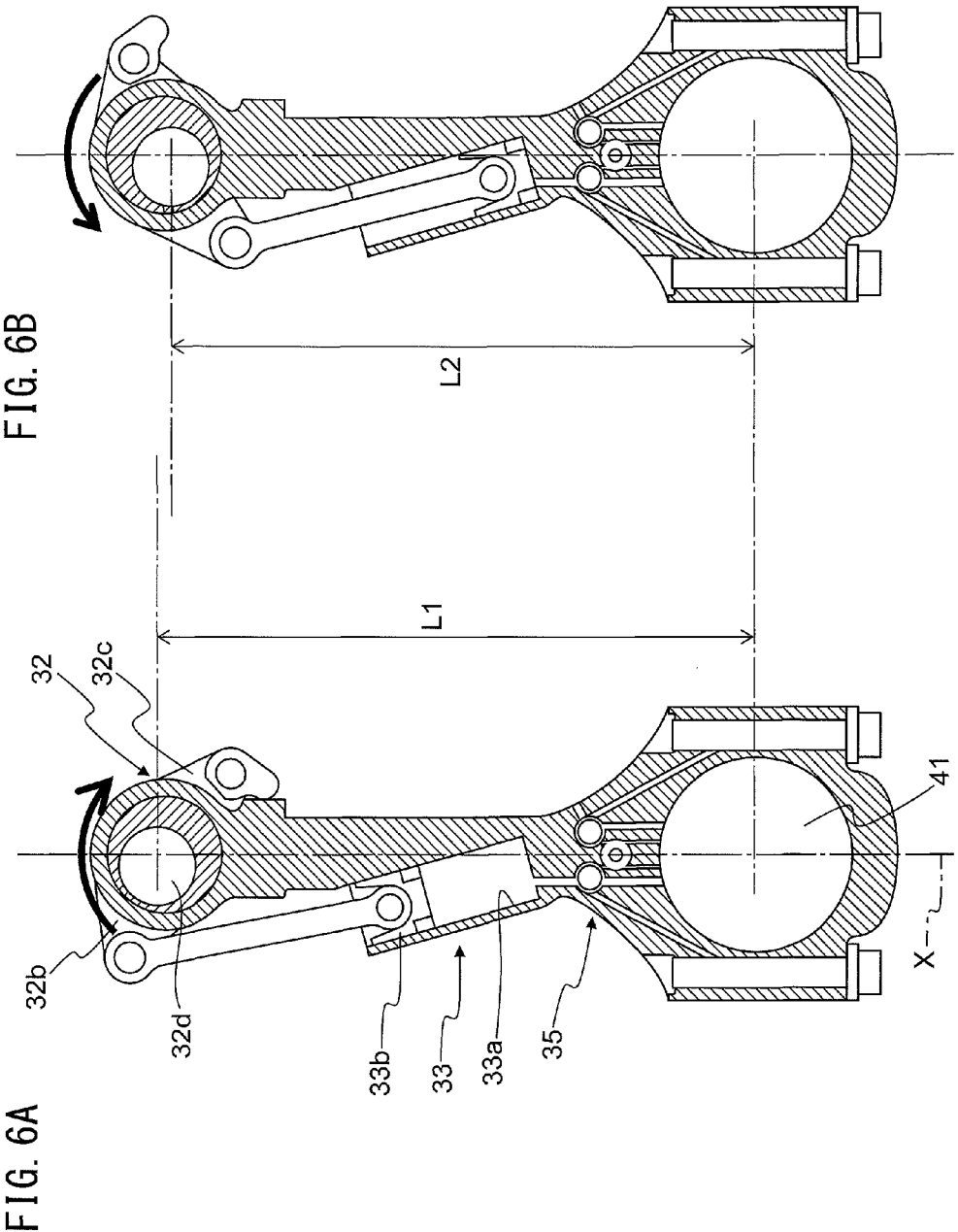
FIGS. 6A and 6B are cross-sectional side views which schematically show a variable length connecting rod according to the present invention.

Next, referring to FIGS. 6A and 6B, the operations of the thus configured eccentric member 32 and piston mechanism 33 will be explained. FIG. 6A shows the state where the inside of the hydraulic cylinder 33a of the piston mechanism 33 is supplied with hydraulic fluid. On the other hand, FIG. 6B shows the state where the inside of the hydraulic cylinder 33a of the piston mechanism 33 is not supplied with hydraulic fluid.

In this regard, as explained later, the flow direction switching mechanism 35 can switch the flow of hydraulic fluid between a first state where it permits the supply of hydraulic fluid from the outside (for example, the later explained hydraulic fluid supply source) to the hydraulic cylinder 33a, but prohibits the discharge of hydraulic fluid from the hydraulic cylinder 33a, and a second state where it prohibits the supply of hydraulic fluid to the hydraulic cylinder 33a, but permits the discharge of hydraulic fluid from the hydraulic cylinder 33a.

If the flow direction switching mechanism 35 is in the first state where it permits the supply of hydraulic fluid from the outside to the hydraulic cylinder 33a, but prohibits the discharge of hydraulic fluid from the hydraulic cylinder 33a, as shown in FIG. 6A, the inside of the hydraulic cylinder 33a is supplied with the hydraulic fluid. Therefore, the hydraulic piston 33b rises and the first arm 32b of the eccentric member 32, which is connected to the hydraulic piston 33b, also rises. As a result, in the example shown in FIG. 6A, the eccentric member 32 swivels in the arrow direction of the figure. Due to this, the position of the piston pin receiving opening 32d rises. Therefore, the length between the center of the crank pin receiving opening 41 and the center of the piston pin receiving opening 32d, that is, the effective length of the connecting rod 6, becomes longer and becomes L1 in the figure. That is, if the hydraulic cylinder 33a is supplied with hydraulic fluid, the effective length of the connecting rod 6 becomes longer. Note that, at this time, the swivel action of the eccentric member 32 in the arrow direction in FIG. 6A is stopped by the bent ends of the second arms 32c of the eccentric member 32 abutting against the side surface of the connecting rod body 31.

On the other hand, if the flow direction switching mechanism 35 is in the second state where it prohibits the supply of hydraulic fluid to the hydraulic cylinder 33a, but permits the discharge of hydraulic fluid from the hydraulic cylinder 33a, as shown in FIG. 6B, the hydraulic cylinder 33a discharges hydraulic fluid. Therefore, the hydraulic piston 33b descends and the first arms 32b which are connected to the hydraulic piston 33b also descend. As a result, in the example shown in FIG. 6B, the eccentric member 32 swivels in the arrow direction in the figure (direction opposite to arrow of FIG. 6A). Due to this, the position of the piston pin receiving opening 32d descends. Therefore, the length between the center of the crank pin receiving opening 41 and the center of the piston pin receiving opening 32d, that is, the effective length of the connecting rod 6, becomes L2 shorter than L1 in the figure. That is, if the hydraulic cylinder 33a discharges hydraulic fluid, the effective length of the connecting rod 6 becomes shorter. Note that, at this time, the swivel action of the eccentric member 32 in the arrow direction of FIG. 6B is stopped by the hydraulic piston 33b abutting against the bottom part of the hydraulic cylinder 33a.

In the connecting rod 6 according to the present embodiment, as explained above, by switching the flow direction switching mechanism 35 between the first state and the second state, it is possible to switch the effective length of the connecting rod 6 between L1 and L2. As a result, in an internal combustion engine 1 using the connecting rod 6, it is possible to change the mechanical compression ratio.

In this regard, when the flow direction switching mechanism 35 is in the first state, even if hydraulic fluid is not supplied from the outside, the hydraulic piston 33b moves to the position shown in FIG. 6A. This is because when the piston 5 reciprocates in the cylinder of the internal combustion engine 1 and an upward inertia force acts on the piston 5, the hydraulic piston 33b moves in the extension direction. On the other hand, when the piston 5 reciprocates in the cylinder of the internal combustion engine 1 and a downward inertia force acts on the piston 5 or when the air-fuel mixture burns in the combustion chamber 7 and a downward force acts on the piston 5, the hydraulic piston 33b is tried to be pushed in. However, since the flow direction switching mechanism 35 prohibits the discharge of hydraulic fluid from the hydraulic cylinder 33a, the hydraulic fluid in the hydraulic cylinder 33a does not flow out, and therefore the hydraulic piston 33b is not pushed in.

On the other hand, even when the flow direction switching mechanism 35 is in the second state, the hydraulic piston 33b moves to the position shown in FIG. 6B. This is because when the piston 5 reciprocates in the cylinder of the internal combustion engine 1 and a downward inertia force acts on the piston 5 or when the air-fuel mixture burns in the combustion chamber 7 and a downward force acts on the piston 5, the hydraulic piston 33b is pushed in and therefore hydraulic fluid in the hydraulic cylinder 33a is discharged. On the other hand, when the piston 5 reciprocates in the cylinder of the internal combustion engine 1 and an upward inertia force acts on the piston 5, the hydraulic piston 33b tries to move toward the extension direction. However, since the flow direction switching mechanism 35 prohibits the flow of hydraulic fluid to the hydraulic cylinder 33a, the hydraulic cylinder 33a is not supplied with hydraulic fluid and therefore the hydraulic piston 33b is not extended.

<Configuration of Flow Direction Switching Mechanism>

Figure 7:
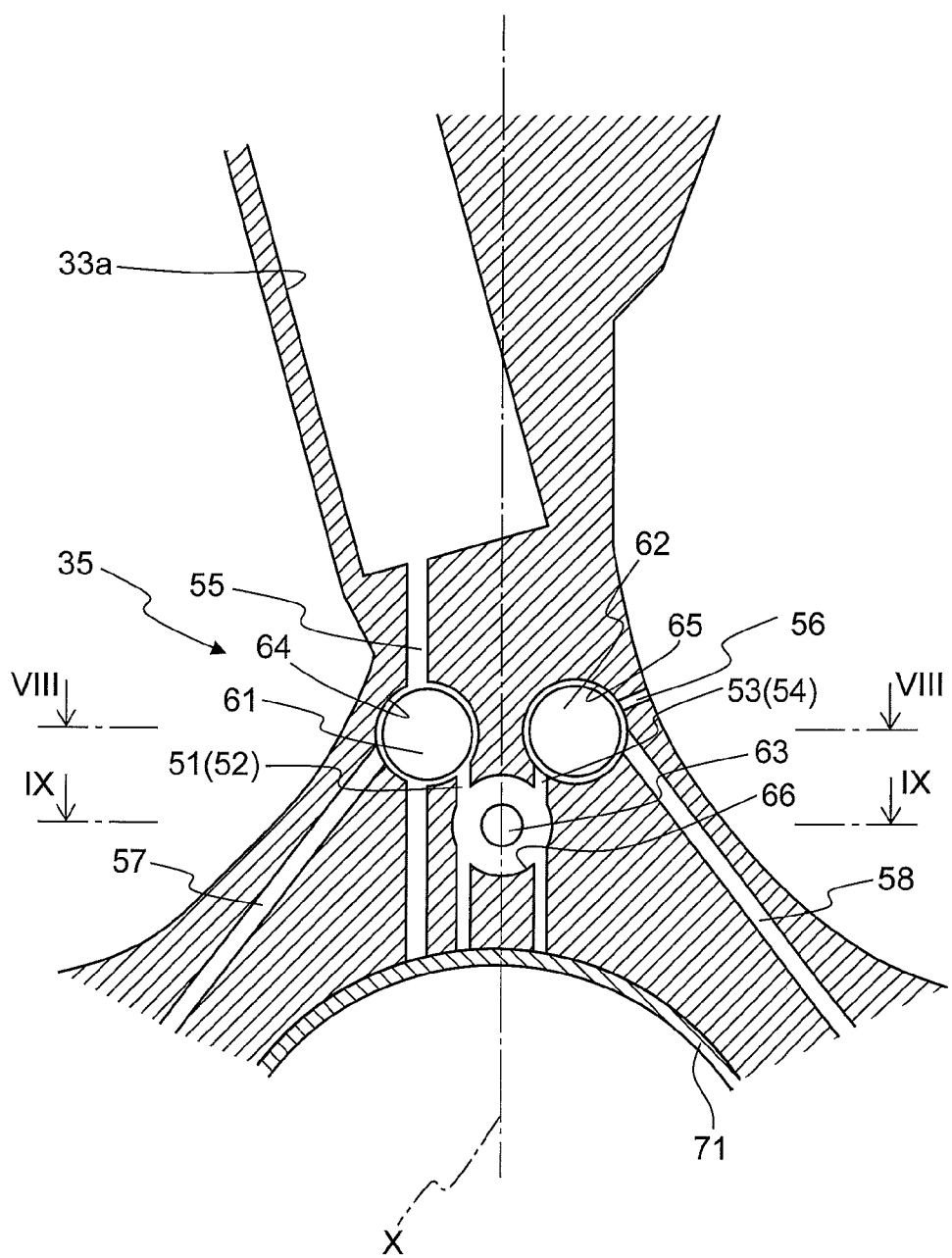
FIG. 7 is a cross-sectional side view of a connecting rod, in which a region where a flow direction switching mechanism is provided is enlarged.
Figure 8A:
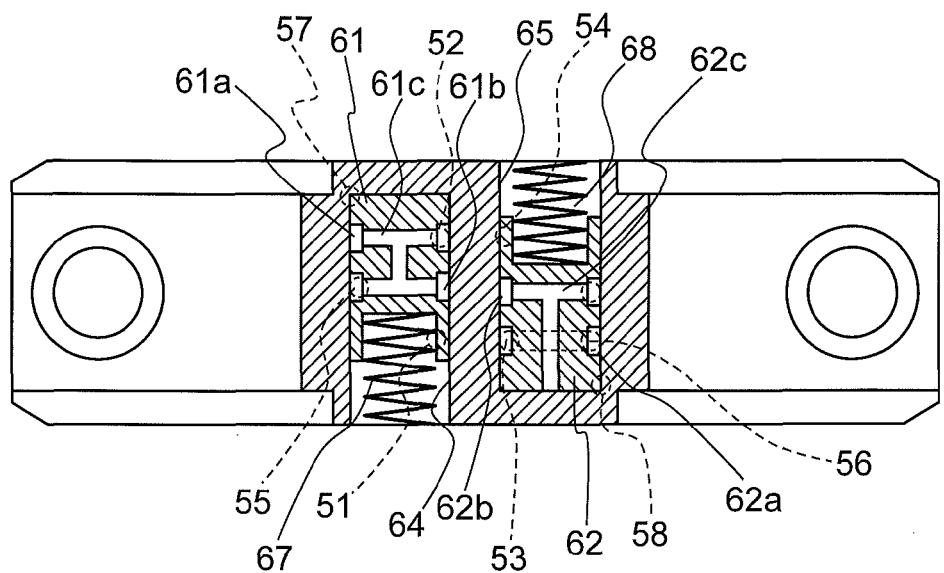
FIGS. 8A and 8B are cross-sectional views of a connecting rod along VIII-VIII and IX-IX of FIG. 7.
Figure 8B:
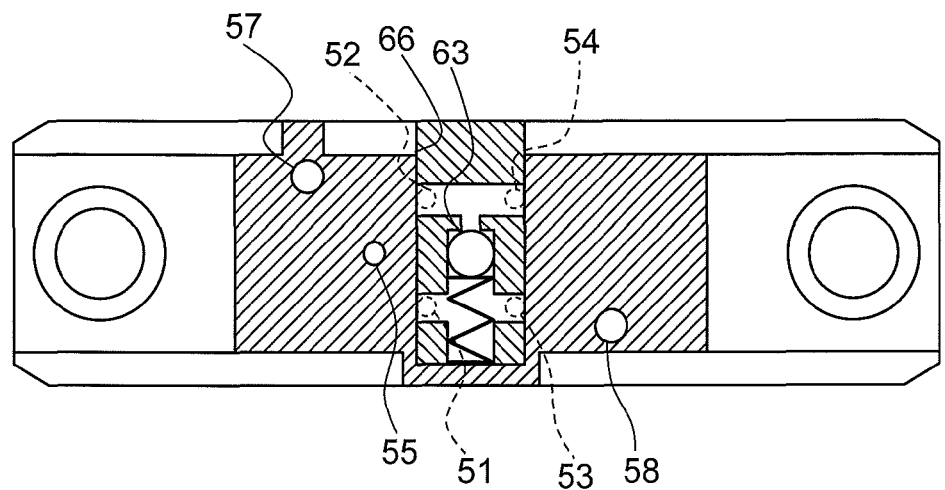

Next, referring to FIG. 7 and FIGS. 8A and 8B, the configuration of the flow direction switching mechanism 35 will be explained. FIG. 7 is a cross-sectional side view of a connecting rod, in which the region where the flow direction switching mechanism 35 is provided, is enlarged. FIG. 8A is a cross-sectional view of a connecting rod along VIII-VIII of FIG. 7, while FIG. 8B is a cross-sectional view of a connecting rod along IX-IX of FIG. 7. As explained above, the flow direction switching mechanism 35 can switch the flow of hydraulic fluid between a first state where it permits the supply of hydraulic fluid from the outside to a hydraulic cylinder 33a, but prohibits the discharge of hydraulic fluid from the hydraulic cylinder 33a, and a second state where it prohibits the supply of hydraulic fluid to the hydraulic cylinder 33a, but permits the discharge of hydraulic fluid from the hydraulic cylinder 33a.

The flow direction switching mechanism 35, as shown in FIG. 7, comprises two switching pins 61, 62 and one check valve 63. These two switching pins 61, 62 and check valve 63 are arranged between the hydraulic cylinder 33a and the crank pin receiving opening 41 in the axis X direction of the connecting rod body 31. Further, the check valve 63 is arranged to the crank pin receiving opening 41 side from the two switching pins 61, 62 in the axis X direction of the connecting rod body 31.

Furthermore, the two switching pins 61, 62 are provided at the both sides of the axis X of the connecting rod body 31 while the check valve 63 is provided on the axis X. Accordingly, it is possible to suppress a drop in the left and right balance of weight of the connecting rod body 31 due to provision of the switching pins 61, 62 and check valve 63 in the connecting rod body 31.

The two switching pins 61, 62 are respectively held in the cylindrical pin holding spaces 64, 65. In the present embodiment, the pin holding spaces 64, 65 are formed so that their axes extend in parallel with the center axis of the crank pin receiving opening 41. The switching pins 61, 62 can slide in the pin holding spaces 64, 65 in the direction in which the pin holding space 64 extends. That is, the switching pins 61, 62 are arranged in the connecting rod body 31 so that their operating directions become parallel to the center axis of the crank pin receiving opening 41.

Further, among the two pin holding spaces 64, 65, the first pin holding space 64 which holds the first switching pin 61, as shown in FIG. 8A, is formed as a pin holding hole which is opened to one side surface of the connecting rod body 31 and is closed to the other side surface of the connecting rod body 31. In addition, among the two pin holding spaces 64, 65, the second pin holding space 65 which holds the second switching pin 62, as shown in FIG. 8A, is formed as a pin holding hole which is opened to the other side surface of the connecting rod body 31 and is closed to the one side surface.

The first switching pin 61 has two circumferential grooves 61a, 61b which extend in the circumferential direction. These circumferential grooves 61a, 61b are communicated with each other by a communicating path 61c formed in the first switching pin 61. Further, in the first pin holding space 64, a first biasing spring 67 is held. Due to this first biasing spring 67, the first switching pin 61 is biased in a direction parallel to the center axis of the crank pin receiving opening 41. In particular, in the example shown in FIG. 8A, the first switching pin 61 is biased toward the closed end of the first pin holding space 64.

Similarly, the second switching pin 62 also has two circumferential grooves 62a, 62b which extend in the circumferential direction. Among these grooves, one circumferential groove 62a is communicated with one end of the second switching pin 62 (end at side where second biasing spring 68 is not provided) by a communicating path 62c formed in the second switching pin 62. Further, in the second pin holding space 65, a second biasing spring 68 is held. Due to this second biasing spring 68, the second switching pin 62 is biased in a direction parallel to the center axis of the crank pin receiving opening 41. In particular, in the example shown in FIG. 8A, the second switching pin 62 is biased toward the closed end of the second pin holding space 65.

As a result, the second switching pin 62 is biased in the opposite direction from the first switching pin 61. Therefore, in the present embodiment, when the first switching pin and second switching pin 62 are supplied with hydraulic pressure, the directions of operation of these first switching pin 61 and second switching pin 62 is opposite to each other.

The check valve 63 is held in a cylindrical check valve holding space 66. In the present embodiment, the check valve holding space 66 is formed to extend in parallel with the center axis of the crank pin receiving opening 41. The check valve 63 can move in the check valve holding space 66 in the direction in which the check valve holding space 66 extends. Therefore, the check valve 63 is arranged in the connecting rod body so that its direction of operation is parallel with the center axis of the crank pin receiving opening 41. Further, the check valve holding space 66 is formed as a check valve holding hole which is opened to one side surface of the connecting rod body 31 and is closed to the other side surface of the connecting rod body 31.

The check valve 63 is configured to permit flow from a primary side (in FIG. 8B, top side) to the secondary side (in FIG. 8B, bottom side) and to prohibit the flow from the secondary side to the primary side.

The first pin holding space 64 which holds the first switching pin 61 is communicated through the two space communicating fluid paths 51, 52 with the check valve holding space 66. One of these, i.e., first space communicating fluid path 51, as shown in FIG. 8A, is communicated with the secondary side of the first pin holding space 64 and check valve holding space 66 at one side surface side (in FIG. 8B, bottom side) from the center of the connecting rod body 31 in the thickness direction. The other of these, i.e., second space communicating fluid path 52 is communicated with the primary side of the first pin holding space 64 and check valve holding space 66 at the other side surface side (in FIG. 8B, top side) from the center of the connecting rod body 31 in the thickness direction.

Further, the second pin holding space 65 which holds the second switching pin 62 is communicated through the two space communicating fluid paths 53, 54 with the check valve holding space 66. One of these, i.e., third space communicating fluid path 53, as shown in FIG. 8A, is communicated with the secondary side of the second pin holding space 65 and check valve holding space 66 at one side surface side (in FIG. 8B, bottom side) from the center of the connecting rod body 31 in the thickness direction. The other of these, i.e., fourth space communicating fluid path 54 is communicated with the primary side of the first pin holding space 64 and check valve holding space 66 at the other side surface side (in FIG. 8B, top side) from the center of the connecting rod body 31 in the thickness direction.

The first pin holding space 64 which holds the first switching pin 61, is communicated through the piston communicating fluid path 55 to the hydraulic cylinder 33a. As shown in FIG. 8A, the piston communicating fluid path 55 is communicated with the first pin holding space 64 near the center of the connecting rod body 31 in the thickness direction. Further, the piston communicating fluid path 55 is arranged so that the interval between the first space communicating fluid path 51 and piston communicating fluid path 55 in connecting rod body thickness direction and the interval between the second space communicating fluid path 52 and piston communicating fluid path 55 in the connecting rod body thickness direction is equal to the interval between the circumferential grooves 61a, 61b in the connecting rod body thickness direction.

Further, the second pin holding space 65 which holds the second switching pin 62 is communicated with the exhaust fluid path 56 which is communicated with the outside of the connecting rod body 31. The exhaust fluid path 56, as shown in FIG. 8A, is arranged at the same position as the third space communicating fluid path 53 in the axial direction of the second pin holding space 65. That is, the exhaust fluid path 56 is configured to simultaneously communicate with the circumferential groove 62a when the circumferential groove 62a of the second switching pin 62 communicates with the third space communicating fluid path 53.

These fluid paths 51 to 55 are formed by machining by a drill, etc., from the crank pin receiving opening 41. Therefore, these fluid paths 51 to 55 extend to the crank pin receiving opening 41. In other words, the fluid paths 51 to 55 are respectively formed so that the crank pin receiving opening 41 is positioned on their extensions. These fluid paths 51 to 55 are, for example, closed by bearing metal 71.

As explained above, the fluid paths 51 to 55 are all closed by bearing metal 71. Therefore, these fluid paths 51 to 55 can be closed, by assembling the connecting rod 6 with the crank pin 22 by using bearing metal 71, without separate processing for closing the fluid paths 51 to 55.

Further, in the connecting rod body 31, the first control fluid path 57 for supplying the first switching pin 61 with hydraulic pressure and the second control fluid path 58 for supplying the second switching pin 62 with hydraulic pressure, are formed. The first control fluid path 57 is communicated with the first pin holding space 64 at the end opposite from the end at which the first biasing spring 67 is provided. The second control fluid path 58 is communicated with the second pin holding space 65 at the end at the opposite side from the end at which the second biasing spring 68 is provided. These control fluid paths 57, 58 are formed communicated with the crank pin receiving opening 41 and are communicated through the fluid path (not shown) which is formed in the crank pin 22 to the outside hydraulic pressure supply source.

Therefore, when an external hydraulic pressure supply source is not supplying hydraulic pressure, the first switching pin 61 and second switching pin 62 are biased by the first biasing spring 67 and second biasing spring 68 respectively and thus, as shown in FIG. 8A, are positioned at the closed end sides in the pin holding spaces 64, 65. On the other hand, when an external hydraulic pressure supply source is supplying hydraulic pressure, the first switching pin 61 and second switching pin 62 are moved against the biasing forces by the first biasing spring 67 and second biasing spring 68, and thus are positioned at the opened end sides in the pin holding spaces 64, 65.

<Operation of Flow Direction Switching Mechanism>

Figure 9:
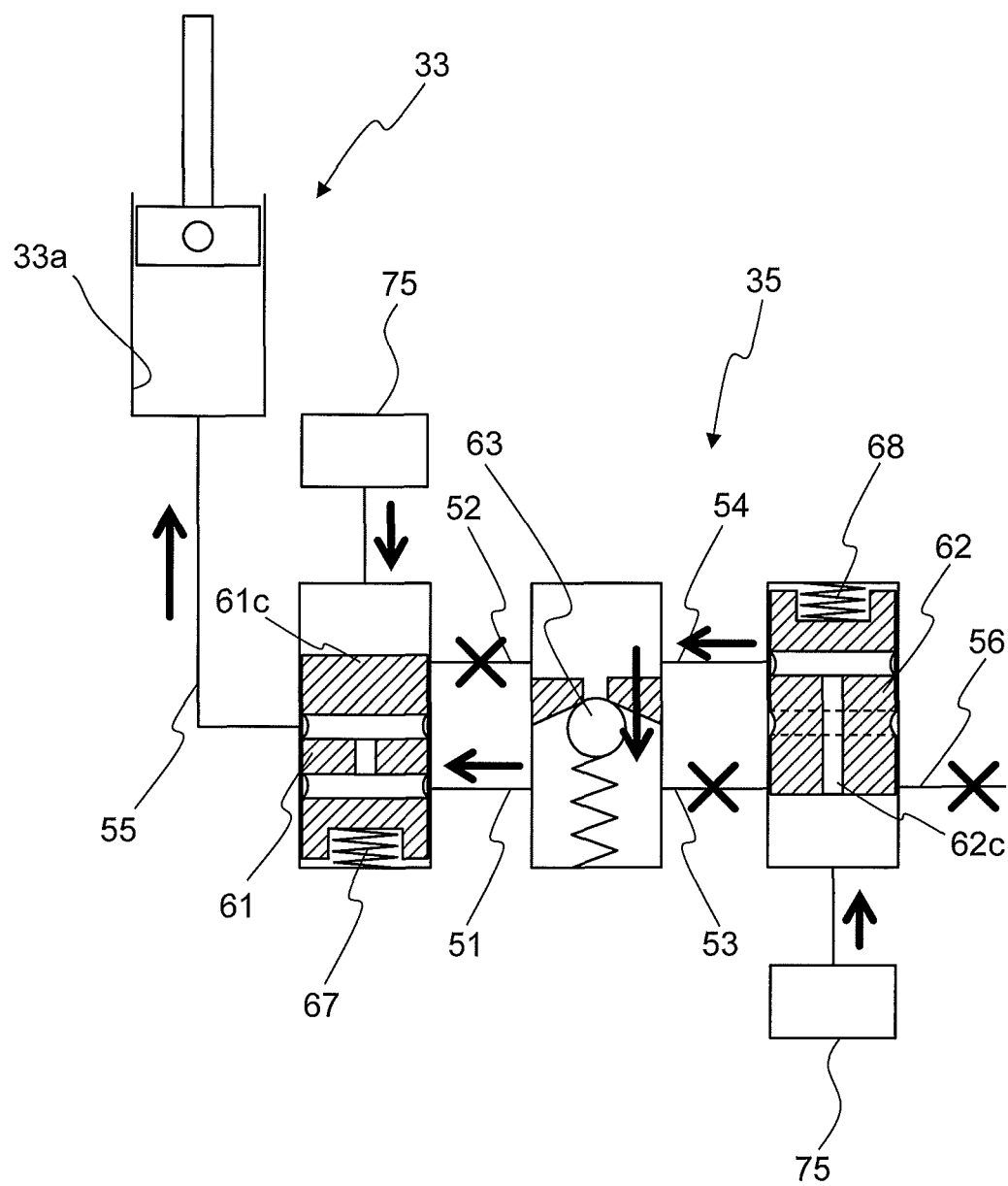
FIG. 9 is a schematic view which explains an operation of a flow direction switching mechanism when hydraulic pressure is supplied from a hydraulic pressure supply source to a switching pin.
Figure 10:
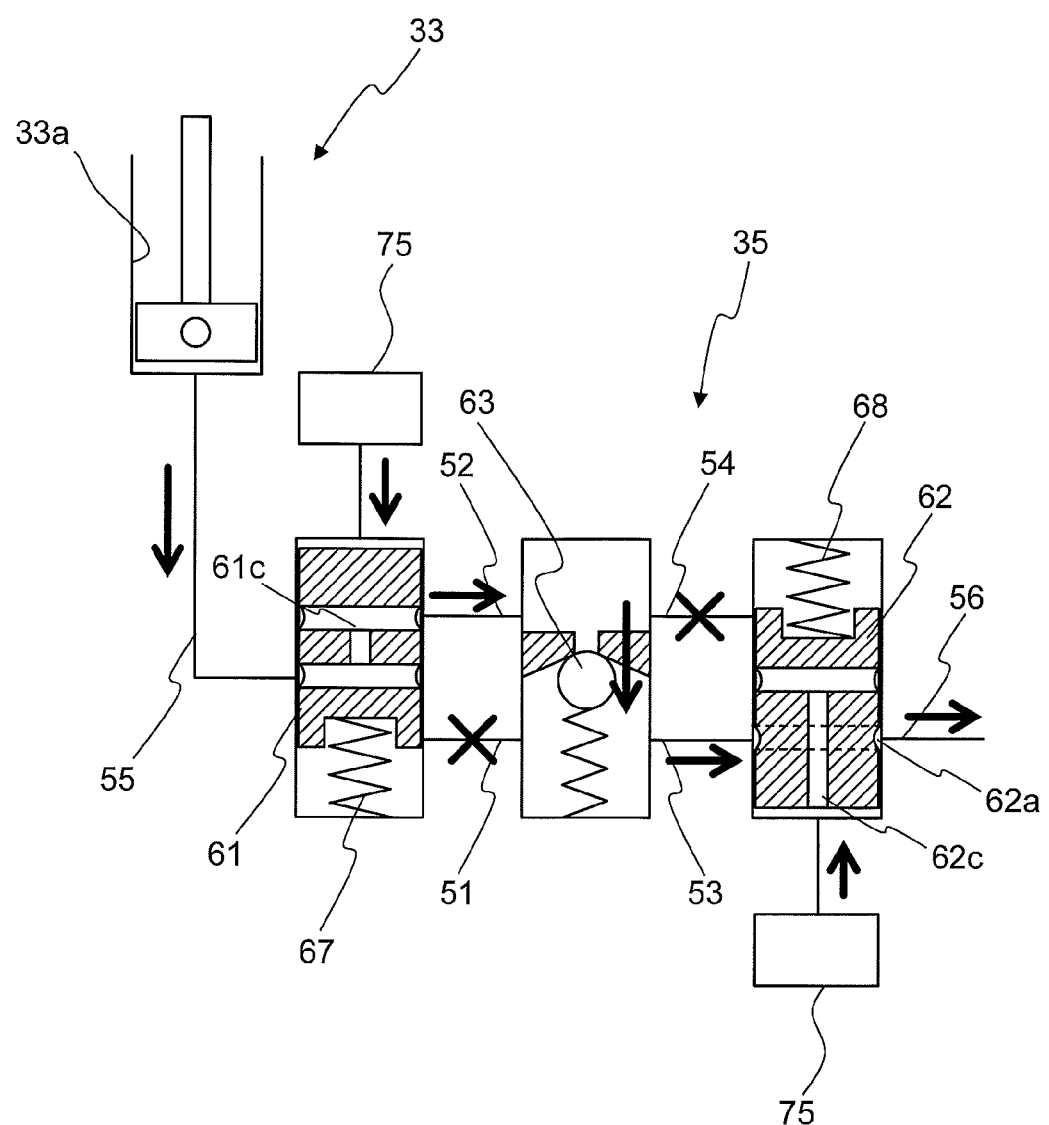
FIG. 10 is a schematic view which explains an operation of a flow direction switching mechanism when hydraulic pressure is not supplied from a hydraulic pressure supply source to a switching pin.

Next, referring to FIG. 9 and FIG. 10, the operation of the flow direction switching mechanism 35 will be explained. FIG. 9 is a schematic view which explains the operation of the flow direction switching mechanism 35 when the hydraulic pressure supply source 75 supplies hydraulic pressure to the switching pins 61, 62. Further, FIG. 10 is a schematic view which explains the operation of the flow direction switching mechanism 35 when the hydraulic pressure supply source 75 supplies hydraulic pressure to the switching pins 61, 62. Note that, in FIG. 9 and FIG. 10, hydraulic pressure supply sources 75 which supply hydraulic pressure to the first switching pin 61 and second switching pin 62 are drawn separately, but in the present embodiment, the same hydraulic pressure supply source is used to supply hydraulic pressure.

As shown in FIG. 9, when the hydraulic pressure supply source 75 supplies hydraulic pressure, the switching pins 61, 62 are respectively positioned at first positions to which they move against the biasing forces of the biasing springs 67, 68. As a result, the piston communicating fluid path 55 and the first space communicating fluid path 51 are communicated with each other by the communicating path 61c of the first switching pin 61. The hydraulic pressure supply source 75 and the fourth space communicating fluid path 54 are communicated with each other by the communicating path 62c of the second switching pin 62. Therefore, the hydraulic cylinder 33a is connected to the secondary side of the check valve 63, while the hydraulic pressure supply source 75 is connected to the primary side of the check valve 63.

In this regard, the check valve 63 is configured to permit the flow of hydraulic fluid from the primary side at which the second space communicating fluid path 52 and the fourth space communicating fluid path 54 are communicated to the secondary side at which the first space communicating fluid path 51 and the third space communicating fluid path 53 are communicated, but to prohibit the opposite flow. Therefore, in the state shown in FIG. 9, hydraulic fluid flows from the fourth space communicating fluid path 54 to the first space communicating fluid path 51, but hydraulic fluid does not conversely flow.

As a result, in the state shown in FIG. 9, the hydraulic fluid of the hydraulic pressure supply source 75 can be supplied to the hydraulic cylinder 33a by passing through the fluid path in the order of the fourth space communicating fluid path 54, first space communicating fluid path 51, and piston communicating fluid path 55. However, the hydraulic fluid in the hydraulic cylinder 33a cannot be discharged from the hydraulic cylinder 33a. Therefore, when hydraulic pressure is supplied from the hydraulic pressure supply source 75, it can be said that the flow direction switching mechanism 35 is in the first state where it permits the supply of hydraulic fluid from an outside hydraulic pressure supply source 75 to the hydraulic cylinder 33a, but prohibits the discharge of hydraulic fluid from the hydraulic cylinder 33a. As a result, as explained above, the hydraulic piston 33b rises, and therefore the effective length of the connecting rod 6 becomes longer as shown in FIG. 6A by L1. Note that, the rise in the hydraulic pressure piston 33b at this time is not only due to the hydraulic pressure of the hydraulic fluid which is supplied from the hydraulic pressure supply source 75, but also, as explained above, due to the piston 5 reciprocating in the cylinder of the internal combustion engine 1 and upward inertia force acting on the piston 5.

On the other hand, as shown in FIG. 10, when the hydraulic pressure from the hydraulic pressure supply source 75 is not supplied, the switching pins 61, 62 are positioned at second positions where they are respectively biased by the biasing springs 67, 68. As a result, by the communicating path 61c of the first switching pin 61, the piston communicating fluid path 55 and the second space communicating fluid path 52 can be communicated with each other. In addition, by the circumferential groove 62a of the second switching pin 62, the third space communicating fluid path 53 and exhaust fluid path 56 are communicated with each other. Therefore, the hydraulic cylinder 33a is connected to the primary side of the check valve 63, while the exhaust fluid path 56 is connected to the secondary side of the check valve 63.

According to the action of the above-mentioned check valve 63, in the state shown in FIG. 10, the hydraulic fluid in the hydraulic cylinder 33a can be discharged to the outside through the fluid path from the piston communicating fluid path 55, second space communicating fluid path 52, third space communicating fluid path 53, and exhaust fluid path 56 in that order. However, according to the action of the check valve 63, hydraulic fluid cannot be supplied from the exhaust fluid path 56 side to the hydraulic cylinder 33a. Therefore, when the hydraulic pressure is not supplied from the hydraulic pressure supply source 75, it can be said that the flow direction switching mechanism 35 is in the state where it prohibits the supply of hydraulic fluid to the hydraulic cylinder 33a, but permits the discharge of hydraulic fluid from the hydraulic cylinder 33a. As a result, as explained above, the hydraulic piston 33b descends, therefore the effective length of the connecting rod 6 becomes shorter as shown by L2 in FIG. 6A.

Note that, the descent of the hydraulic piston 33b at this time, as explained above, is performed by the action of the downward direction force on piston 5 due to the combustion of the air-fuel mixture and the action of the downward inertia force on the piston 5 due to the piston 5 reciprocating in the cylinder of the internal combustion engine 1. Further, there is the action of the upward inertia force on the piston 5 due to the piston 5 reciprocating in the cylinder of the internal combustion engine 1. At this time, the hydraulic piston 33b tries to rise. However, due to the action of the check valve 63, hydraulic fluid is not supplied to the hydraulic cylinder 33a, and therefore if the hydraulic piston 33b tries to rise, a large negative pressure is formed in the hydraulic cylinder 33a. Therefore, even if a downward inertia force acts on the piston 5, the hydraulic piston 33b does not rise and therefore the effective length of the connecting rod 6 is maintained short as it is.

Advantageous Effects of Present Embodiment

Next, the actions and effects of the variable length connecting rod of the present embodiment will be explained. In the variable length connecting rod of the present embodiment, only one piston mechanism 33 is provided. In this regard, if a piston mechanism is provided, a piston is provided in the connecting rod body, and therefore the total weight of the connecting rod becomes larger. Further, to make up for the drop in strength of the connecting rod body due to a cylinder formed in the connecting rod body, it is necessary to reinforce the connecting rod body. Due to this as well, the total weight of the connecting rod becomes larger. As opposed to this, in the present embodiment, only one piston mechanism 33 is provided, and therefore it is possible to suppress an increase in the total weight of the connecting rod which is based on making it possible to change the effective length of the connecting rod.

Further, in the present embodiment, a flow direction switching mechanism 35 which can switch the flow of hydraulic fluid between a first state where it permits the supply of hydraulic fluid from the outside to the hydraulic cylinder 33a, but prohibits the outflow of hydraulic fluid from the hydraulic cylinder 33a and a second state where it prohibits the supply of hydraulic fluid to the hydraulic cylinder 33a, but permits the outflow of hydraulic fluid from the hydraulic cylinder 33a, is provided. By using such a flow direction switching mechanism 35, even if only one piston mechanism 33 is provided, the effective length of the connecting rod 6 can be switched between two stages of L1 and L2.

In this regard, the connecting rod 6 moves in a direction perpendicular to the center axis of the crank pin receiving opening 41 along with rotation of the crankshaft. Therefore, the switching pins 61, 62 and check valve 63 are acted on by inertia force in a direction perpendicular to the center axis of the crank pin receiving opening 41. On the other hand, the connecting rod 6 does not move in a direction parallel to the center axis of the crank pin receiving opening 41 even if the crankshaft rotates. Therefore, the switching pins 61, 62 and check valve 63 are not acted on by inertia force in a direction parallel to the center axis of the crank pin receiving opening 41.

In this regard, in the above embodiment, the operating directions of the switching pins 61, 62 and check valve 63 are parallel to the center axis of the crank pin receiving opening 41. Therefore, the switching pins 61, 62 and check valve 63 can prevent inertia force from acting in the operating direction and therefore suppress mistaken operation of the switching pins 61, 62 and check valve 63 along with inertia force.

Further, in the present embodiment, the flow of hydraulic fluid is switched by the switching pins 61, 62 of the flow direction switching mechanism 35. The switching pins 61, 62 are held in the pin holding spaces 64, 65 formed in the connecting rod body 31 and are driven by hydraulic pressure. Therefore, there is no longer a need to make the switching pins 61, 62 project out from the side surface of the connecting rod body 31 to the outside, and there is no longer a need to provide another switching mechanism at the outside of the connecting rod 6 for operating the switching pins 61, 62. Therefore, the flow direction switching mechanism 35 can be configured simply and compactly.

Further, in the present embodiment, the flow direction switching mechanism 35 comprises two switching pins 61, 62 and one check valve 63. As a result of the flow direction switching mechanism 35 configured in this way, the fluid path communicating the pin holding spaces 64, 65 which holds the switching pins 61, 62, the check valve holding space 66 which holds the check valve 63, and the hydraulic cylinder 33a and second cylinder 34a can be easily manufactured.

Furthermore, according to the present embodiment, the flow direction switching mechanism 35 is configured so that it becomes a first state and therefore the effective length of the connecting rod 6 becomes longer when hydraulic pressure is supplied from the hydraulic pressure supply source 75 to the switching pins 61, 62, and becomes a second state and therefore the effective length of the connecting rod 6 becomes shorter when hydraulic pressure is not supplied from the hydraulic pressure supply source 75 to the switching pins 61, 62. Accordingly, for example, when hydraulic pressure can no longer be supplied due to breakdown of the hydraulic pressure supply source 75, etc., the effective length of the connecting rod 6 can be kept short as is, and therefore the mechanical compression ratio can be maintained low. If maintaining the mechanical compression ratio high, the output of the internal combustion engine is limited, and therefore according to the present embodiment, it is possible to keep output by the internal combustion engine from limited due to breakdown of the hydraulic pressure supply source 75, etc.

Further, the two switching pins 61, 62 and check valve 63 are arranged between the hydraulic cylinder 33a and the crank pin receiving opening 41 in the axis X direction of the connecting rod body 31. Accordingly, the distance between the crank pin receiving opening 41, and the switching pins 61, 62 and check valve 63 can be made shorter and thus the length of the fluid path, etc., which extends between them, can be made shorter.

Second Embodiment

Next, referring to FIG. 11 to FIG. 17, a variable length connecting rod 6' according to a second embodiment of the present invention will be explained. The configuration and operation of the variable length connecting rod 6' according to the second embodiment are, except for the points explained below, basically similar to the configuration and operation of the variable length connecting rod 6 according to the first embodiment.

<Configuration of Variable Length Connecting Rod According to Second Embodiment>

Figure 11:
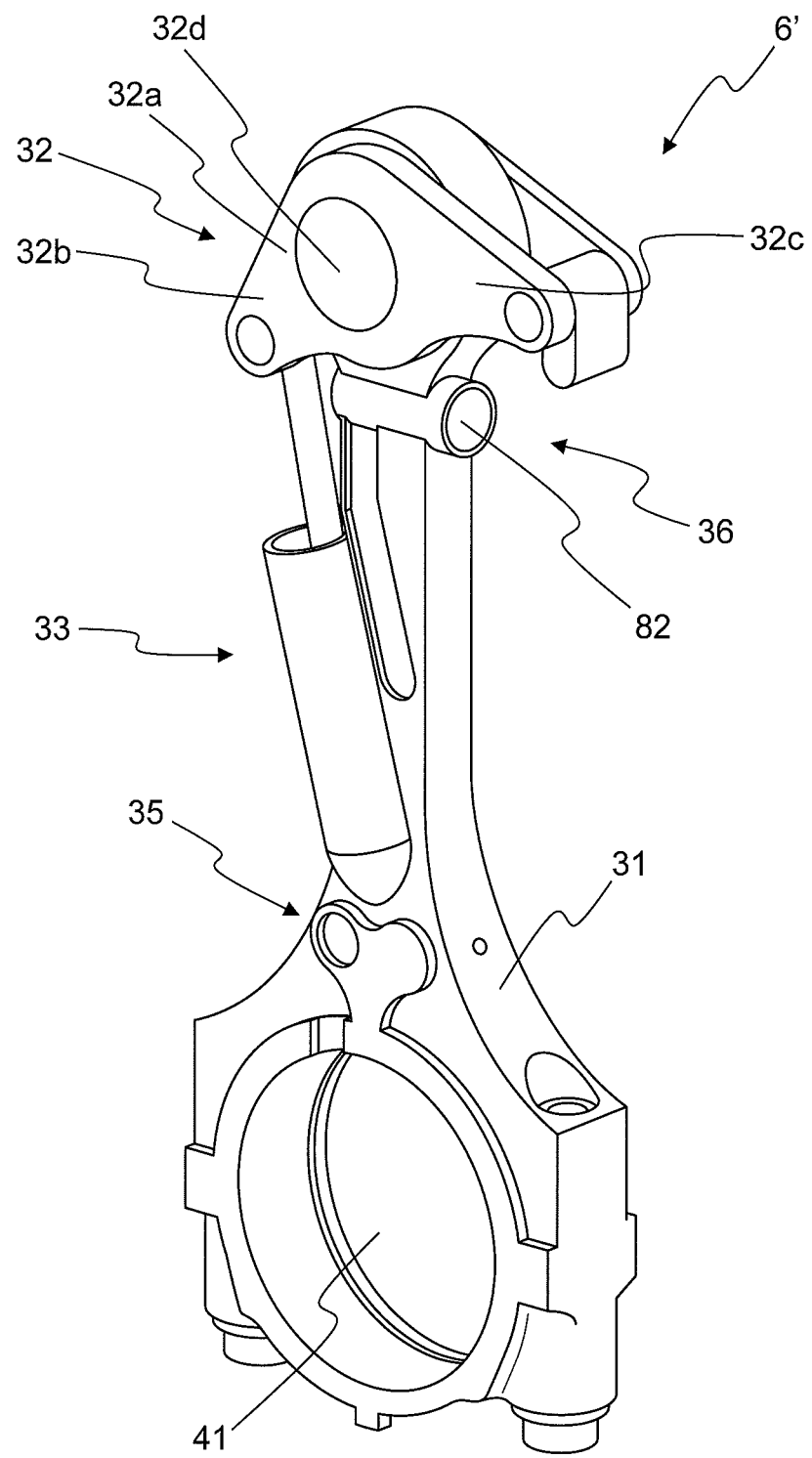
FIG. 11 is a perspective view, similar to FIG. 2, which schematically shows a variable length connecting rod according to a second embodiment.
Figure 12:
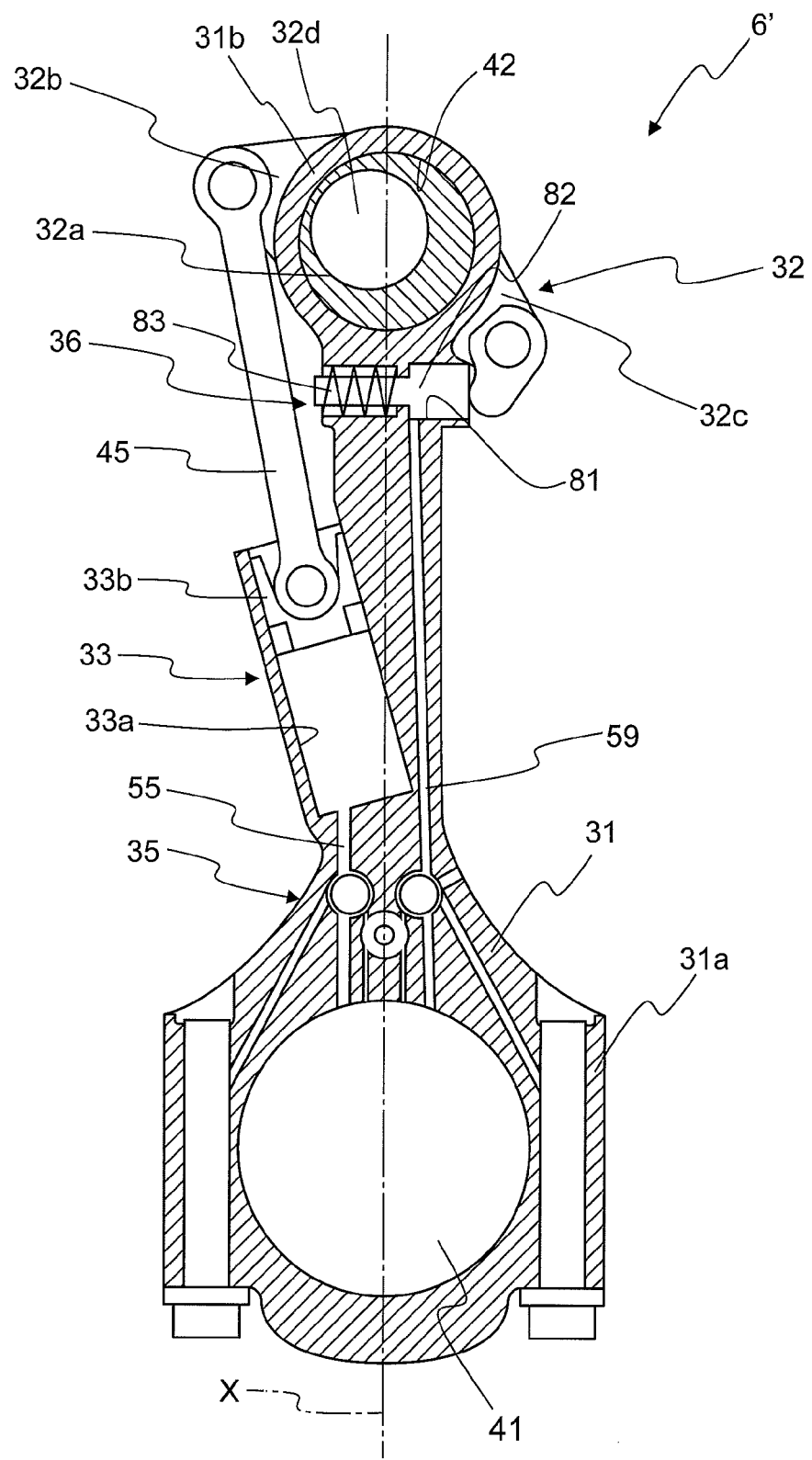
FIG. 12 is a cross-sectional side view, similar to FIG. 3, which schematically shows a variable length connecting rod according to a second invention.
Figure 13:
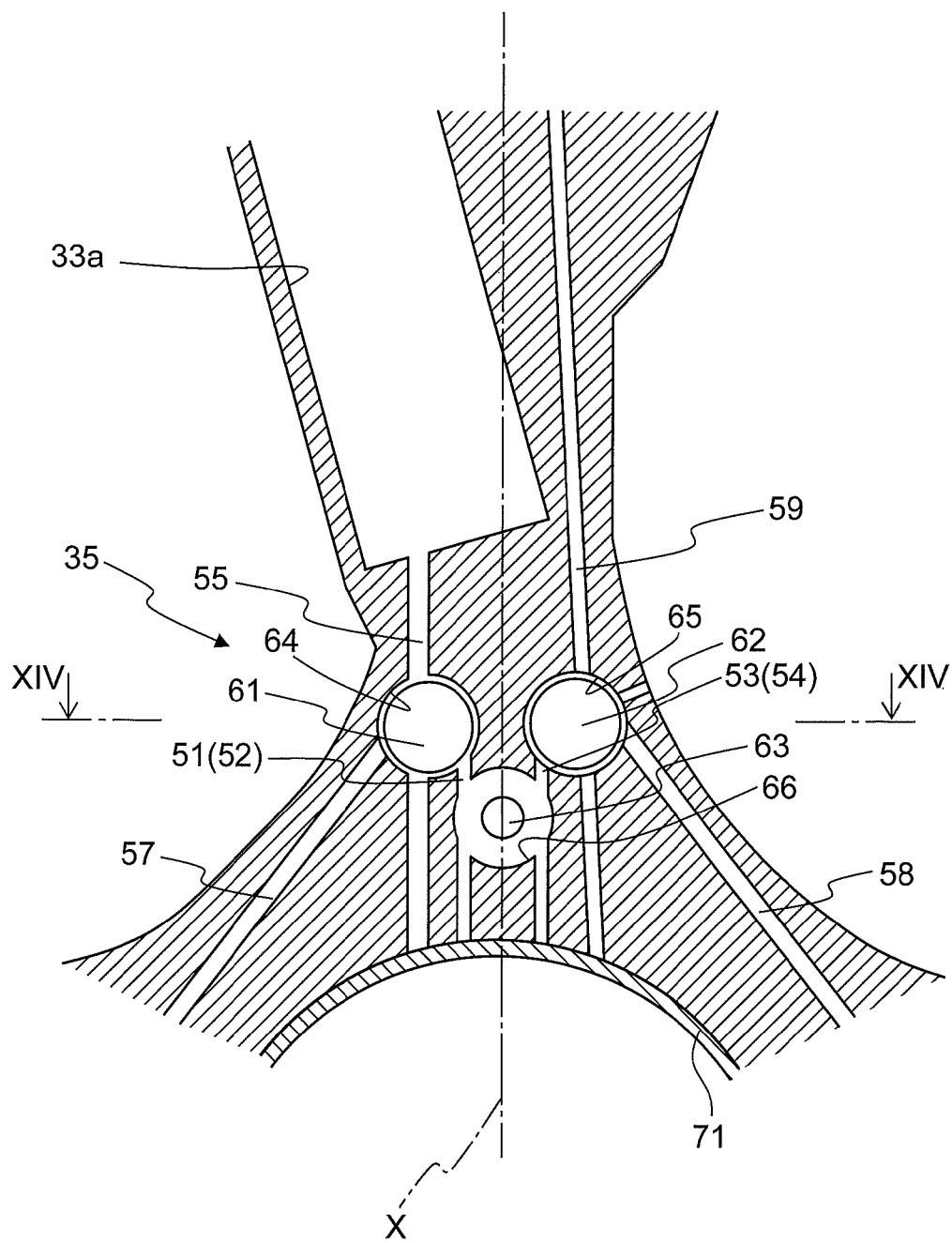
FIG. 13 is a cross-sectional side view of a connecting rod, similar to FIG. 7, in which a region where a flow direction switching mechanism is provided is enlarged.
Figure 14:
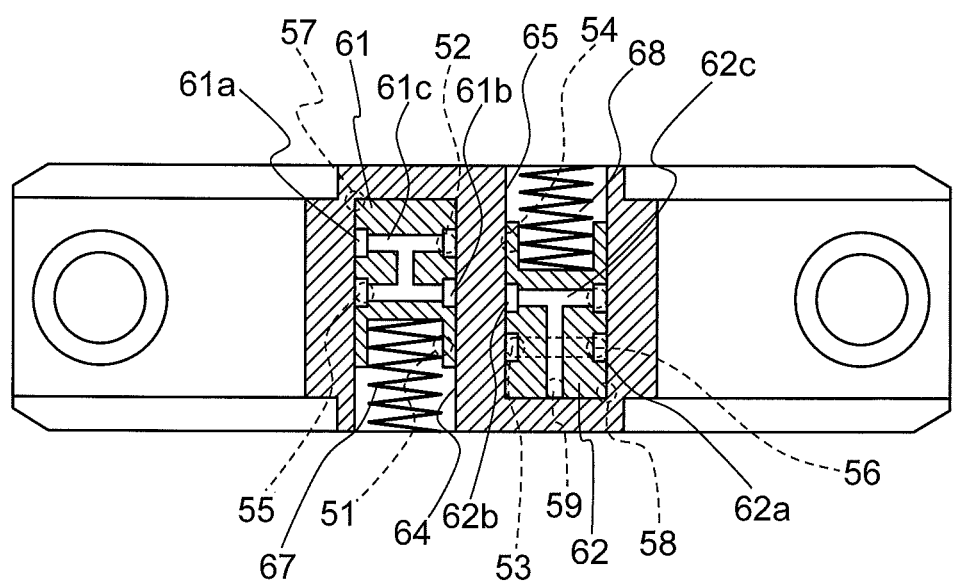
FIG. 14 is a cross-sectional view of a connecting rod, similar to FIG. 8A, along XIV-XIV of FIG. 13.

FIG. 11 is a perspective view, similar to FIG. 2, which schematically shows the variable length connecting rod 6' according to the second embodiment. Further, FIG. 12 is a cross-sectional side view, similar to FIG. 3, which schematically shows a variable length connecting rod 6' according to the second embodiment. In addition, FIG. 13 is a cross-sectional side view of a connecting rod, similar to FIG. 7, which enlarges a region where a flow direction switching mechanism is provided. FIG. 14 is a cross-sectional view of a connecting rod, similar to FIG. 8A, along XIV-XIV of FIG. 13.

As shown in FIG. 11 and FIG. 12, the variable length connecting rod 6' of the present embodiment comprises a stopping device 36 which can make the eccentric member 32 stop at one intermediate position between a first position where it swivels the most to one direction and a second position where it swivels the most to the opposite direction from the one direction.

The stopping device 36 comprises a stopping cylinder 81 formed in the connecting rod body 31 and a stopping member 82 slidable in this stopping cylinder 81. In the example shown in FIG. 12, the stopping cylinder 81 and stopping member 82 are arranged so that their axes extend in the width direction of the connecting rod body 31. However, stopping cylinder 81 and stopping member 82 may also be arranged with somewhat of an angle from the width direction of the connecting rod body 31.

The stopping member 82 can slide between a projecting position where it projects out at least partially from a connecting rod body 31 at the second arm side of the eccentric member 32 and a retracted position where it is almost entirely held inside the connecting rod body 31 (that is, in the stopping cylinder 81). The stopping member 82 is arranged so as to be able to abut against the second arm 32c of the eccentric member 32 both when at the projecting position and when at the retracted position.

The stopping device 36 comprises a biasing spring 83 which biases the stopping member 82 to a retracted position. Further, the stopping cylinder 81 of the stopping device 36 is connected through the hydraulic pressure supply fluid path 59 to the second pin holding space 65. The hydraulic pressure supply fluid path 59, as shown in FIG. 14, is connected to the second pin holding space 65 at the end at the side at which the second control fluid path 58 is connected to the second pin holding space 65. Note that, the hydraulic pressure supply fluid path 59 is also formed by machining from the crank pin receiving opening 41 by a drill, etc. Therefore, as shown in FIG. 13, the hydraulic pressure supply fluid path 59 also extends up to the crank pin receiving opening 41 and is closed by the bearing metal 71.

In the thus configured stopping device 36, when the stopping cylinder 81 is not supplied with a certain or more high hydraulic pressure through the hydraulic pressure supply fluid path 59, due to the action of the biasing spring 83, the stopping member 82 is pulled back to the retracted position. On the other hand, when the stopping cylinder 81 is supplied with a certain or more high hydraulic pressure through the hydraulic pressure supply fluid path 59, due to the action of the hydraulic fluid supplied to the stopping cylinder 81, the stopping member 82 is moved to the projecting position.

Next, referring to FIGS. 15A to 15C, the operations of the thus configured eccentric member 32, piston mechanism 33, and stopping device 36 will be explained. FIG. 15A shows the state where the hydraulic cylinder 33a of the piston mechanism 33 is supplied with hydraulic fluid and where the stopping cylinder 81 of the stopping device 36 is not supplied with hydraulic fluid. FIG. 15B shows the state where the hydraulic cylinder 33a of the piston mechanism 33 is supplied with hydraulic fluid and where the stopping cylinder 81 of the stopping device 36 is also supplied with hydraulic fluid. FIG. 15C shows the state where the hydraulic cylinder 33a of the piston mechanism 33 and the stopping cylinder 81 of the stopping device 36 are both not supplied with the hydraulic fluid.

First, if the flow direction switching mechanism 35 is in the first state, as shown in FIG. 15A and FIG. 15B, the hydraulic cylinder 33a is supplied with hydraulic fluid. Therefore, in the same way as FIG. 6A, the hydraulic piston 33b rises and the first arm 32b of the eccentric member 32 which is connected to the hydraulic piston 33b also rises.

At this time, if the stopping device 36 is not supplied with enough hydraulic pressure for making the stopping member 82 move, the stopping member 82 is arranged at the retracted position. As a result, as shown in FIG. 15A, the eccentric member 32 is swiveled to the position where it swivels most in the direction of the arrow in the figure. Accordingly, the position of the piston pin receiving opening 32d rises the most. Therefore, the length between the center of the crank pin receiving opening 41 and the center of the piston pin receiving opening 32d, that is, the effective length of the connecting rod 6, becomes longer and becomes L1 in the figure.

On the other hand, if the flow direction switching mechanism 35 is in the first state and, at this time, the stopping device 36 is supplied with hydraulic pressure enough for making the stopping member 82 move, the stopping member 82 is arranged at the projecting position. As a result, the eccentric member 32 is swiveled in the direction shown by the arrow in FIG. 15B slightly from the state shown in FIG. 15A. Accordingly, the position of the piston pin receiving opening 32d is descended from the position where it is raised the most. Therefore, the effective length of the connecting rod 6 becomes shorter from the state shown in FIG. 15A or becomes L2 in the figure.

On the other hand, if the flow direction switching mechanism 35 is in the second state, as shown in FIG. 15C, the hydraulic cylinder 33a is not supplied with hydraulic fluid. Therefore, in the same way as the case shown in FIG. 6B, the hydraulic piston 33b descends and the first arm 32b of the eccentric member 32 which is connected to the hydraulic piston 33b also descends. As a result, as shown in FIG. 15C, the eccentric member 32 is swiveled to the position where it is swiveled most in the arrow direction in the figure. Accordingly, the piston pin receiving opening 32d falls the most in position. Therefore, the effective length of the connecting rod 6 becomes shorter and becomes L3 in the figure.

Therefore, according to the present embodiment, when the flow direction switching mechanism 35 is in the first state, the stopping member 82 of the stopping device 36 is arranged at the projecting position, whereby the eccentric member 32 can be stopped at an intermediate position (FIG. 15B) between a first position where it is swiveled most to one side (FIG. 15A) and a second position where it is swiveled most to the opposite side (FIG. 15C). As a result, the effective length of the connecting rod 6 can be changed in the three stages of L1, L2, and L3. Accordingly, the mechanical compression ratio of the internal combustion engine 1 can be changed in three stages.

<Operations of Flow Direction Switching Mechanism and Stopping Device>

Figure 16:
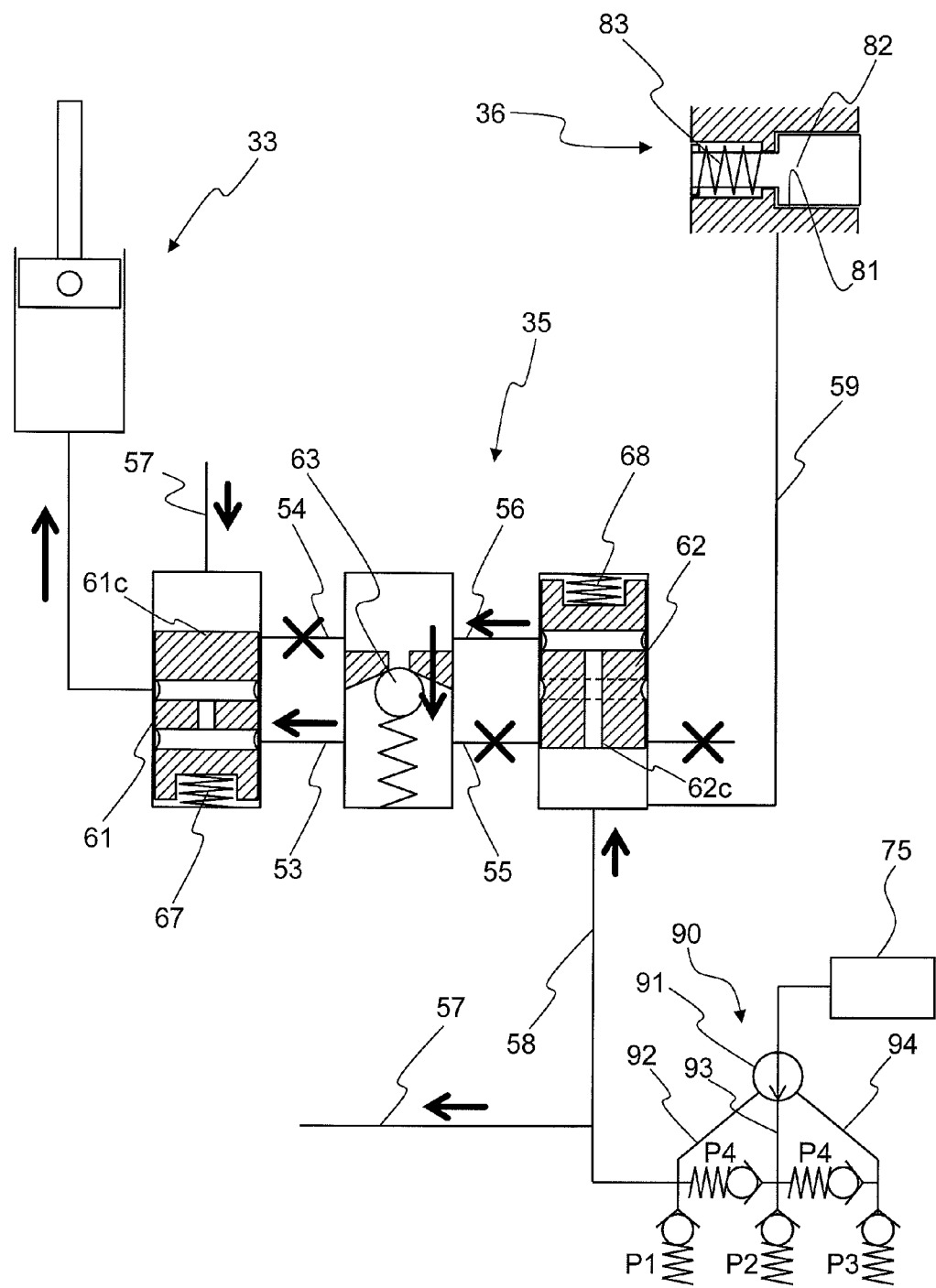
FIG. 16 is a view for explaining the operations of a flow direction switching mechanism and stopping device.
Figure 17:
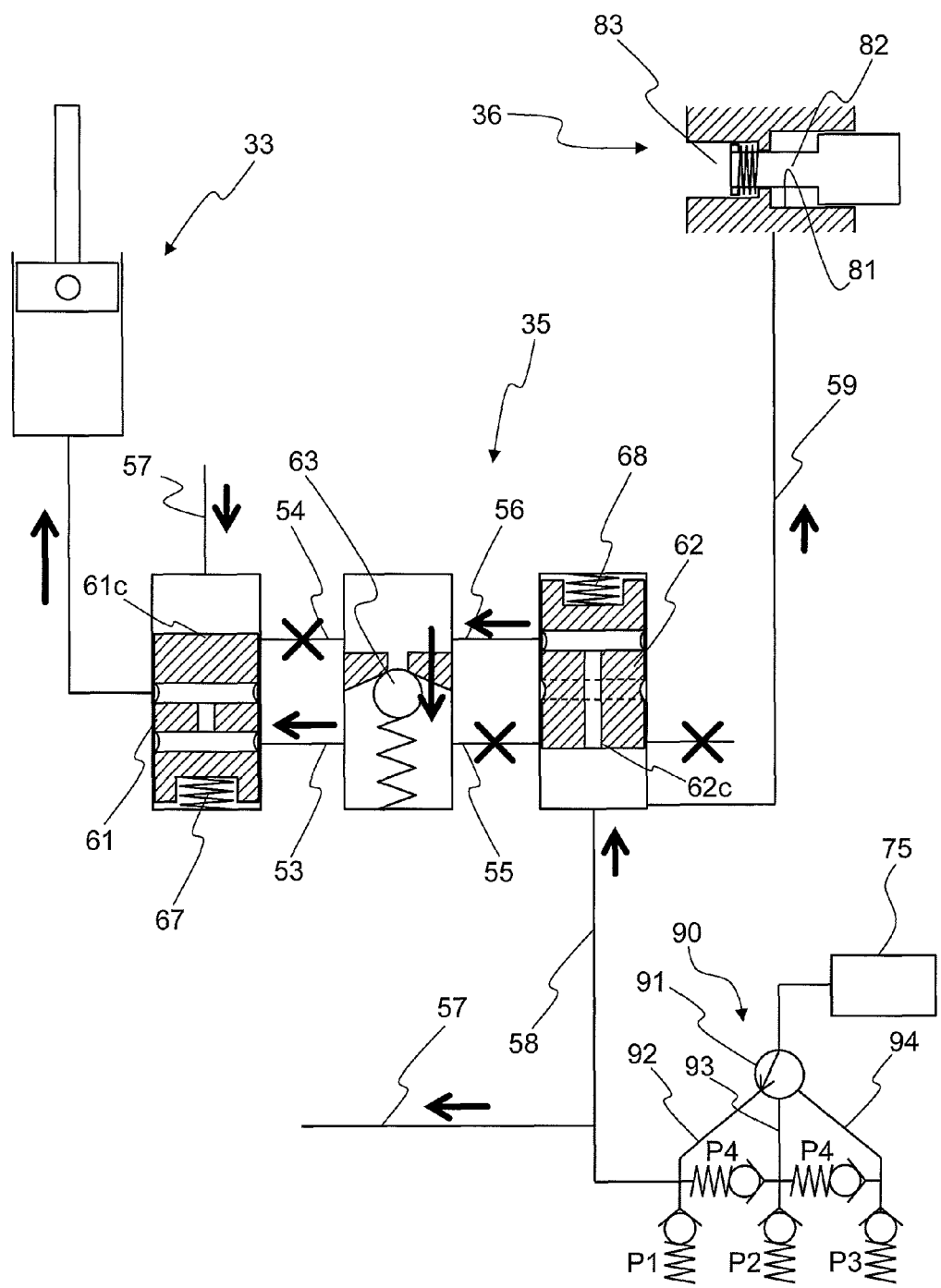
FIG. 17 is a view for explaining the operations of a flow direction switching mechanism and stopping device.

Next, referring to FIG. 16 to FIG. 18, the operations of the flow direction switching mechanism 35 and stopping device 36 will be explained. In this regard, in the present embodiment, the first switching pin 61, second switching pin 62, and stopping member 82 of the flow direction switching mechanism 35 are supplied with hydraulic fluid from the same hydraulic pressure supply source 75. Accordingly, the pressures of the hydraulic fluid supplied to these first switching pin 61, second switching pin 62, and stopping member 82 are the same.

In this regard, the pressure of the hydraulic fluid at which the operating positions of the first switching pin 61 and second switching pin 62 are switched, that is, the pressure of the hydraulic fluid at which the flow direction switching mechanism 35 is switched between the first state and second state, is referred to as the "first threshold value". This first threshold value changes in accordance with the cross-sectional areas of the switching pins 61, 62 (or cross-sectional areas of the pin holding spaces 64, 65) and the coefficients of elasticity of the biasing springs 67, 68. Similarly, the pressure at which the operating position of the stopping member 82 is switched between the projecting position and the retracted position is referred to as the "second threshold value". This second threshold value changes in accordance with the cross-sectional area of the stopping member 82 (or cross-sectional area of the stopping cylinder 81) and the coefficient of elasticity of the biasing spring 83. In the present embodiment, the first threshold value is a value smaller than the second threshold value. Therefore, if making the pressure of the hydraulic fluid supplied from the hydraulic pressure supply source 75 rise, first, the operating positions of the first switching pin 61 and second switching pin 62 are switched and thus the flow direction switching mechanism 35 changes from the second state to the first state. Then, if further making the pressure of the hydraulic fluid supplied from the hydraulic pressure supply source 75 rise, the stopping member 82 changes from the retracted position to the projecting position.

Further, in the present embodiment, a hydraulic switching mechanism 90 is provided between the hydraulic pressure supply source 75 and the control fluid paths 57, 58. The hydraulic switching mechanism 90 comprises a three-way valve 91 connected with the hydraulic pressure supply source 75, and three fluid paths 92 to 94 connected to the three-way valve 91. The three fluid paths 92 to 94 are respectively provided with relief valves. The opening pressures of these relief valves differ from each other. In the example shown in FIG. 18, the opening pressure is lower in the order of the opening pressure P1 of the relief valve provided at the fluid path 92, the opening pressure P2 of the relief valve provided at the fluid path 93, and the opening pressure P3 of the relief valve provided at the fluid path 94 (P1>P2>P3). In addition, between the fluid path 92 and the fluid path 93, a relief valve which is opened if the pressure in the fluid path 93 is higher is provided, while between the fluid path 93 and fluid path 94, a relief valve which is opened if the pressure in the fluid path 94 is higher is provided. The opening pressure P4 of the relief valve provided between these fluid paths is set lower than the opening pressure P3 of the relief valve provided at the fluid path 94. In addition, the fluid path 92 is connected with the control fluid paths 57, 58.

In the thus configured hydraulic switching mechanism 90, when the hydraulic pressure supply source 75 is connected to the fluid path 93 by the three-way valve 91, the hydraulic pressure supplied to the control fluid paths 57, 58 is an intermediate extent. In the present embodiment, the hydraulic pressure at this time corresponds to a pressure higher than the first threshold value and lower than the second threshold value. Since the hydraulic pressure at this time is higher than the first threshold value, as shown in FIG. 17, the switching pins 61, 62 are respectively positioned at the first positions which they move to against the biasing forces of the biasing springs 67, 68. As a result, in the same way as the example shown in FIG. 9, the flow direction switching mechanism 35 is in the first state where it permits the supply of hydraulic fluid from an outside hydraulic pressure supply source 75 to the hydraulic cylinder 33a, but prohibits the discharge of hydraulic fluid from the hydraulic cylinder 33a, and therefore the hydraulic piston 33b rises. On the other hand, the hydraulic pressure at this time is lower than the second threshold value, and therefore as shown in FIG. 17, the stopping member 82 is in the retracted position. Therefore, when the hydraulic pressure supply source 75 supplies an intermediate extent of hydraulic pressure, the effective length of the connecting rod 6 becomes longer as shown by L1 in FIG. 15A.

Figure 18:
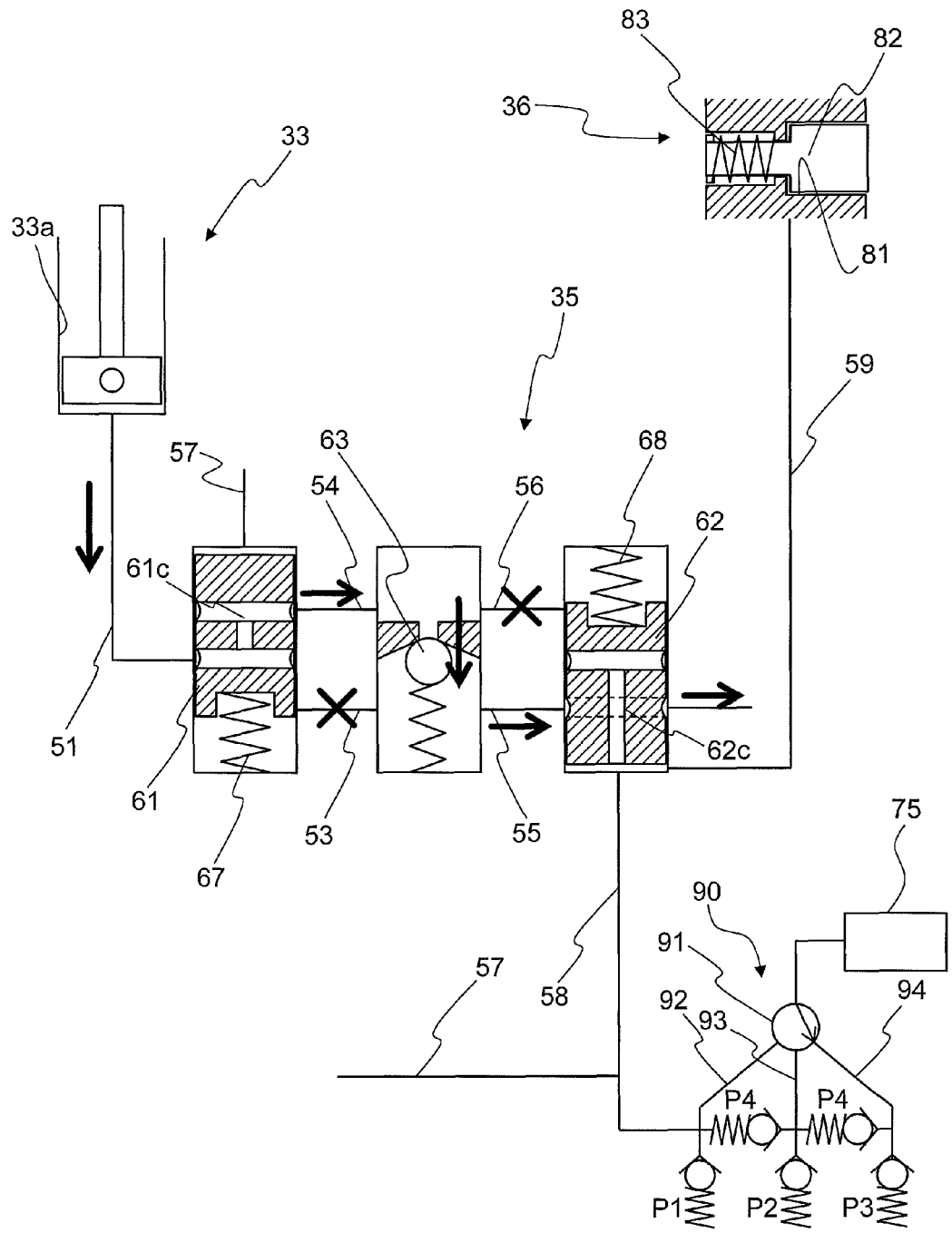
FIG. 18 for explaining the operations of a flow direction switching mechanism and stopping device.

On the other hand, as shown in FIG. 18, in the hydraulic switching mechanism 90, when the hydraulic pressure supply source 75 is connected to the fluid path 92 by the three-way valve 91, the hydraulic pressure supplied to the control fluid paths 57, 58 is high. In the present embodiment, the hydraulic pressure at this time is a pressure higher than the second threshold value. The hydraulic pressure at this time is higher than the first threshold value, and therefore in the same way as the state shown in FIG. 17, the switching pins 61, 62 are positioned at the first positions where they have moved against the biasing forces of the biasing springs 67, 68. Accordingly, the flow direction switching mechanism 35 is in the first state and the hydraulic piston 33b rises. On the other hand, since the hydraulic pressure at this time is higher than the second threshold value, as shown in FIG. 18, the stopping member 82 is in the projecting position. Therefore, when the hydraulic pressure supply source 75 is supplying high hydraulic pressure, the effective length of the connecting rod 6 becomes a length of an intermediate extent shown by L2 in FIG. 15B.

On the other hand, as shown in FIG. 19, in the hydraulic switching mechanism 90, when the hydraulic pressure supply source 75 is connected to the fluid path 94 by the three-way valve 91, the hydraulic pressure supplied to the control fluid paths 57, 58 becomes lower. In the present embodiment, the hydraulic pressure at this time becomes a pressure lower than the first threshold value (corresponding to state in above-mentioned first embodiment expressed as hydraulic pressure not supplied). Therefore, since the hydraulic pressure at this time is lower than the first threshold value, as shown in FIG. 19, the switching pins 61, 62 are respectively positioned at second positions where they are biased by the biasing springs 67, 68. As a result, in the same way as the example shown in FIG. 10, the flow direction switching mechanism 35 is in a second state where it prohibits supply of hydraulic fluid to the hydraulic cylinder 33a, but permits discharge of hydraulic fluid from the hydraulic cylinder 33a, and therefore the hydraulic piston 33b descends. Note that, since the hydraulic pressure at this time is lower than the second threshold value, as shown in FIG. 19, the stopping member 82 is in the retracted position. As a result, when the hydraulic pressure supplied from the hydraulic pressure supply source 75 is low or hydraulic pressure is not supplied, the effective length of the connecting rod 6 becomes longer as shown by L3 in FIG. 15A.

REFERENCE SIGN LIST 1. internal combustion engine
6. connecting rod
21. piston pin
22. crank pin
31. connecting rod body
32. eccentric member
33. piston mechanism
35. flow direction switching mechanism
51. first space communicating fluid path
52. second space communicating fluid path
53. third space communicating fluid path
54. fourth space communicating fluid path
55. piston communicating fluid path
56. exhaust fluid path
57. first control fluid path
58. second control fluid path
59. hydraulic pressure supply fluid path
61. first switching pin
62. second switching pin
63. check valve

The invention claimed is:

1. A variable length connecting rod which can be changed in effective length, comprising:
   a connecting rod body having, at a big end, a crank pin receiving opening which receives a crank pin;
   an eccentric member attached to said connecting rod body at a small end at an opposite side to said big end so as to be able to swivel in a circumferential direction of said small end, the eccentric member changing the effective length of said variable length connecting rod if swiveled;
   a piston mechanism having one hydraulic cylinder provided in said connecting rod body and one hydraulic piston slidable in said hydraulic cylinder, the piston mechanism configured so that if said hydraulic cylinder is supplied with hydraulic fluid, said eccentric member swivels in one direction while if said hydraulic cylinder discharges hydraulic fluid, said eccentric member swivels in the other direction;
   a hydraulic fluid supply source supplying a hydraulic fluid to said hydraulic cylinder; and
   a flow direction switching mechanism which can switch the flow of hydraulic fluid between a first state which permits the supply of hydraulic fluid from said hydraulic fluid supply source to said hydraulic cylinder, but prohibits the discharge of hydraulic fluid from said hydraulic cylinder and a second state which prohibits the supply of hydraulic fluid to said hydraulic cylinder, but permits the discharge of hydraulic fluid from said hydraulic cylinder,
   wherein said variable length connecting rod comprises just one said piston mechanism for swiveling said eccentric member, and
   wherein said flow direction switching mechanism is arranged between said hydraulic cylinder and said crank pin receiving opening in an axial direction of said connecting rod body.

2. The variable length connecting rod according to claim 1, wherein said flow direction switching mechanism can switch between said first state and said second state by hydraulic pressure, and is configured to become said second state where the effective length of said variable length connecting rod becomes shorter when hydraulic pressure is not supplied and to become said first state where the effective length of said variable length connecting rod becomes longer when hydraulic pressure is supplied.

3. The variable length connecting rod according to claim 1, wherein said eccentric member comprises a piston pin receiving opening which receives a piston pin and is configured so that the axis of said piston pin receiving opening is offset from the swivel axis of said eccentric member, and
   wherein an open end of said hydraulic cylinder is arranged at a side where said piston pin receiving opening is offset from an axis of said variable length connecting rod.

4. The variable length connecting rod according to claim 1, wherein said flow direction switching mechanism comprises a switching pin which is provided in said connecting rod body and which operates by hydraulic pressure supplied from the outside, and said switching pin is configured so that by operation of said switching pin, said flow direction switching mechanism is switched between said first state and said second state and is arranged in said connecting rod body so that the operating direction becomes parallel to the axis of said crank pin receiving opening.

5. The variable length connecting rod according to claim 1, wherein the connecting rod further comprises an exhaust fluid path for discharging hydraulic fluid to the outside of said connecting rod body, said flow direction switching mechanism comprises a single check valve which permits flow from a primary side to a secondary side and prohibits flow from a secondary side to a primary side and two switching pins, and said two switching pins are configured so that when said flow direction switching mechanism is in a first state, the primary side of said check valve is communicated with said hydraulic fluid supply source and the secondary side of said check valve is communicated with said hydraulic cylinder, and when the flow direction switching mechanism is in a second state, the primary side of said check valve is communicated with said hydraulic cylinder and the secondary side of said check valve is communicated with said exhaust fluid path.

6. The variable length connecting rod according to claim 5, wherein said two switching pins are provided at the two sides from a center axis of said connecting rod body and said check valve is provided on a center axis of said connecting rod body.

7. The variable length connecting rod according to claim 1, further comprising a stopping device which can use hydraulic pressure to make said eccentric member stop at an intermediate position between a first position at which it is swiveled the most to one side and a second position at which it is swiveled the most to the opposite side from said one side.

8. The variable length connecting rod according to claim 7, wherein
said eccentric member comprises a first arm and a second arm which extends in an opposite direction to said first arm, and the hydraulic piston of said piston mechanism is connected to said first arm, and
said stopping device comprises a stopping member which can project out from said connecting rod body in the direction in which said second arm extends, and is configured so that when stopping member projects out from said connecting rod body, said stopping member abuts against said eccentric member whereby said eccentric member can be stopped at said intermediate position.

9. The variable length connecting rod according to claim 8, wherein
said flow direction switching mechanism can be switched between said first state and said second state by hydraulic pressure supplied from a hydraulic pressure supply source, and said stopping device is switched between a state where said stopping member projects out and a state where it does not project out by hydraulic pressure supplied from said hydraulic pressure supply source, and
a switching hydraulic pressure in said flow direction switching mechanism and a switching hydraulic pressure in said stopping device are different values.

10. The variable length connecting rod according to claim 1, wherein
said eccentric member comprises a first arm and a second arm which extends in an opposite direction to said first arm, and the hydraulic piston of said piston mechanism is connected to said first arm, and
said second arm is bent, at the end at the opposite side to said first arm side, toward the big end of said connecting rod body.

11. A variable compression ratio internal combustion engine which can change a mechanical compression ratio, having a variable length connecting rod according to claim 1,
wherein mechanical compression ratio is changed by changing the effective length of said variable length connecting rod.

* * * * *